US012192169B2

(12) United States Patent
Anderson et al.

(10) Patent No.: US 12,192,169 B2
(45) Date of Patent: Jan. 7, 2025

(54) SEAMLESS CONNECTION TO MULTIPLE WIRELESS CONTROLLERS

(71) Applicant: Lutron Technology Company LLC, Coopersburg, PA (US)

(72) Inventors: David Anderson, Quakertown, PA (US); Agniva Banerjee, Easton, PA (US); Parker Evans, Quakertown, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 18/482,404

(22) Filed: Oct. 6, 2023

(65) Prior Publication Data

US 2024/0039888 A1 Feb. 1, 2024

Related U.S. Application Data

(63) Continuation of application No. 17/215,684, filed on Mar. 29, 2021, now Pat. No. 11,811,727, which is a
(Continued)

(51) Int. Cl.
*H04L 61/5014* (2022.01)
*G05B 19/042* (2006.01)
(Continued)

(52) U.S. Cl.
CPC ........ *H04L 61/5014* (2022.05); *G05B 19/042* (2013.01); *H04L 12/2809* (2013.01);
(Continued)

(58) Field of Classification Search
CPC ............. H04L 61/5014; H04L 12/2809; H04L 12/2814; H04L 61/2514; H04L 61/2517;
(Continued)

(56) References Cited

U.S. PATENT DOCUMENTS 5,248,919 A    9/1993   Hanna et al.
5,848,054 A    12/1998   Mosebrook et al.
(Continued)

FOREIGN PATENT DOCUMENTS

EP         2317827 A2    5/2011
WO    2014/138822 A1    9/2014

OTHER PUBLICATIONS

Lutron Technical et al: "Lutron Home Control+ App Lutron Home Control-1 App for the Apple iPad TM, iPhone TM and iPod touch revision F Lutron Home Control+ App How does the iPad/iphone/ipod Touch connect to my Lutron system?", Feb. 22, 2011, XP055221349, Retrieved from the Internet: URL:http://img.en25.com/Web/Lutron/RadioRA-2-i Pad-i Phone-iT ouch-App•gu ide-vF 1 .pdf [retrieved on Oct. 15, 2015].
(Continued)

*Primary Examiner* — Rachel J Hackenberg
(74) *Attorney, Agent, or Firm* — Michael S. Czarnecki; Glen R. Farbanish; Philip N. Smith

(57) ABSTRACT

A load control system may be provided including control devices and a system controller. The system controller may be configured to broadcast a service set identifier (SSID) and provide a wireless network connection to a network device. The system controller may provide a web page to the network device, wherein the web page may include an indication of target system controllers. The target system controllers may be used for configuring (e.g., associating) the control devices. The system controller may receive an indication of a target system controller selected to associate the control devices. The system controller may determine an address and port number of the target system controller identified by the network device. The system controller may provide, to the network device, the web page from the target
(Continued)

system controller while the network device is connected to the system controller via the wireless network connection.

18 Claims, 17 Drawing Sheets

Related U.S. Application Data continuation of application No. 15/466,239, filed on Mar. 22, 2017, now Pat. No. 10,965,639.

(60) Provisional application No. 62/311,738, filed on Mar. 22, 2016.

(51) Int. Cl.
*H04L 12/28* (2006.01)
*H04L 61/2514* (2022.01)
*H04L 61/2517* (2022.01)
*H04L 67/02* (2022.01)
*H04W 12/06* (2021.01)
*H05B 47/175* (2020.01)
*H05B 47/19* (2020.01)

(52) U.S. Cl.
CPC ...... *H04L 12/2814* (2013.01); *H04L 61/2514* (2013.01); *H04L 61/2517* (2013.01); *H04W 12/068* (2021.01); *H05B 47/175* (2020.01); *H05B 47/19* (2020.01); *G05B 2219/23297* (2013.01); *G05B 2219/23298* (2013.01); *G05B 2219/2642* (2013.01); *H04L 2012/2841* (2013.01); *H04L 67/02* (2013.01)

(58) Field of Classification Search
CPC .......... H04L 2012/2841; G05B 19/042; G05B 2219/23297; G05B 2219/23298; G05B 2219/2642; H04W 12/068; H04W 36/08; H05B 47/175; H05B 47/19
See application file for complete search history.

(56) References Cited

U.S. PATENT DOCUMENTS

| | | | |
|---|---|---|---|
| 5,905,442 A | 8/1999 | Mosebrook et al. | |
| 5,982,103 A | 11/1999 | Mosebrook et al. | |
| 6,803,728 B2 | 10/2004 | Balasubramaniam et al. | |
| 6,927,547 B2 | 8/2005 | Walko, Jr. et al. | |
| 7,675,195 B2 | 3/2010 | Mierta | |
| 7,755,505 B2 | 7/2010 | Johnson et al. | |
| 7,764,162 B2 | 7/2010 | Cash et al. | |
| 7,880,639 B2 | 2/2011 | Courtney et al. | |
| 8,009,042 B2 | 8/2011 | Steiner et al. | |
| 8,050,192 B2 | 11/2011 | Park | |
| 8,199,010 B2 | 6/2012 | Sloan et al. | |
| 8,228,184 B2 | 7/2012 | Blakeley et al. | |
| 8,306,051 B2 | 11/2012 | Stocker | |
| 8,410,706 B2 | 4/2013 | Steiner et al. | |
| 8,417,388 B2 | 4/2013 | Altonen et al. | |
| 8,451,116 B2 | 5/2013 | Steiner et al. | |
| 8,471,779 B2 | 6/2013 | Mosebrook | |
| 8,548,607 B1 | 10/2013 | Belz | |
| 8,598,978 B2 | 12/2013 | Knode | |
| 8,779,905 B2 | 7/2014 | Courtney et al. | |
| 8,823,268 B2 | 9/2014 | Saveri, III et al. | |
| 8,996,188 B2 | 3/2015 | Frader-Thompson | |
| 9,772,612 B2 | 9/2017 | McCarthy, III et al. | |
| 9,893,909 B2 | 2/2018 | Kim | |
| 10,237,806 B2 | 3/2019 | Cohn | |
| 10,444,964 B2 * | 10/2019 | Sundermeyer | H04L 67/75 |
| 10,965,639 B2 * | 3/2021 | Anderson | H04L 61/5014 |
| 11,811,727 B2 * | 11/2023 | Anderson | H04W 36/08 |
| 2006/0138224 A1 | 6/2006 | Azami et al. | |
| 2009/0116579 A1 | 5/2009 | Abraham et al. | |
| 2009/0206983 A1 | 8/2009 | Knode et al. | |
| 2011/0105226 A1 | 5/2011 | Perlman | |
| 2013/0030589 A1 | 1/2013 | Pessina et al. | |
| 2013/0083805 A1 | 4/2013 | Lu | |
| 2014/0001846 A1 | 1/2014 | Mosebrook et al. | |
| 2014/0001977 A1 | 1/2014 | Zacharchuk et al. | |
| 2014/0052783 A1 | 2/2014 | Swatsky et al. | |
| 2014/0132475 A1 | 5/2014 | Bhutani et al. | |
| 2014/0175875 A1 | 6/2014 | Newman, Jr. et al. | |
| 2014/0177469 A1 | 6/2014 | Neyhart | |
| 2014/0180487 A1 | 6/2014 | Bull | |
| 2014/0247117 A1 | 9/2014 | Veskovic | |
| 2014/0265568 A1 | 9/2014 | Crafts et al. | |
| 2014/0269222 A1 | 9/2014 | Patton et al. | |
| 2014/0277805 A1 | 9/2014 | Browne, Jr. et al. | |
| 2015/0002276 A1 | 1/2015 | Kicklighter et al. | |
| 2015/0015377 A1 | 1/2015 | Bull et al. | |
| 2015/0179058 A1 | 6/2015 | Crafts et al. | |
| 2015/0295411 A1 | 10/2015 | Courtney et al. | |
| 2016/0028320 A1 | 1/2016 | Knode et al. | |
| 2016/0043962 A1 | 2/2016 | Kim et al. | |
| 2016/0054023 A1 | 2/2016 | Baker et al. | |
| 2016/0056629 A1 | 2/2016 | Baker et al. | |
| 2016/0205553 A1 | 7/2016 | Lee | |
| 2016/0205745 A1 | 7/2016 | Saveri, III et al. | |
| 2017/0238176 A1 | 8/2017 | Garcia Morchon | |

OTHER PUBLICATIONS

Arunesh Mishra et al: "An empirical analysis of the IEEE 802.11 MAC layer handoff process", Computer Communication Review, ACM, New York, NY, US, vol. 33, No. 2, Apr. 1, 2003, pp. 93-102, XP058246027, ISSN: 0146-4833, DOI: 10.1145/956981.956990.

* cited by examiner

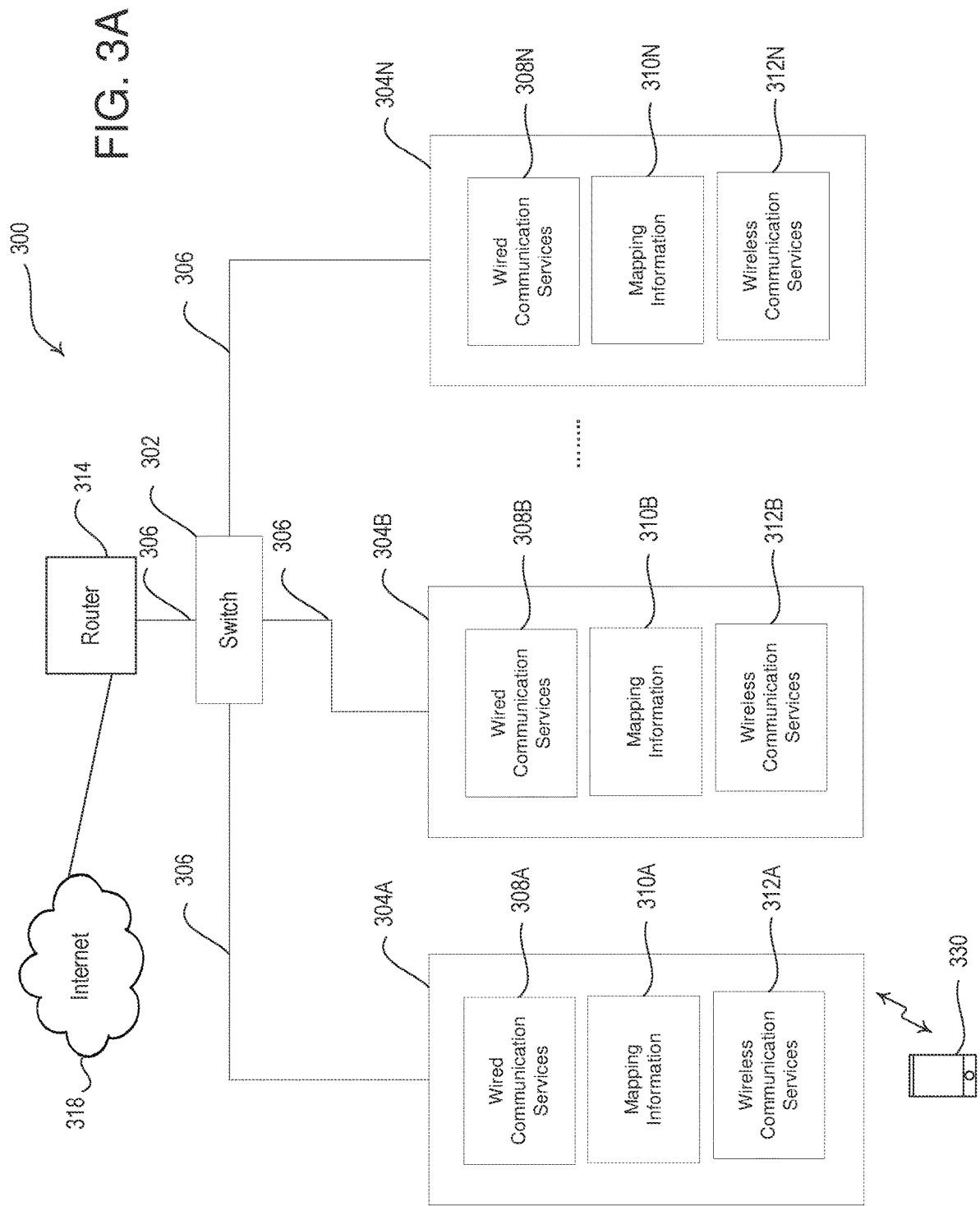

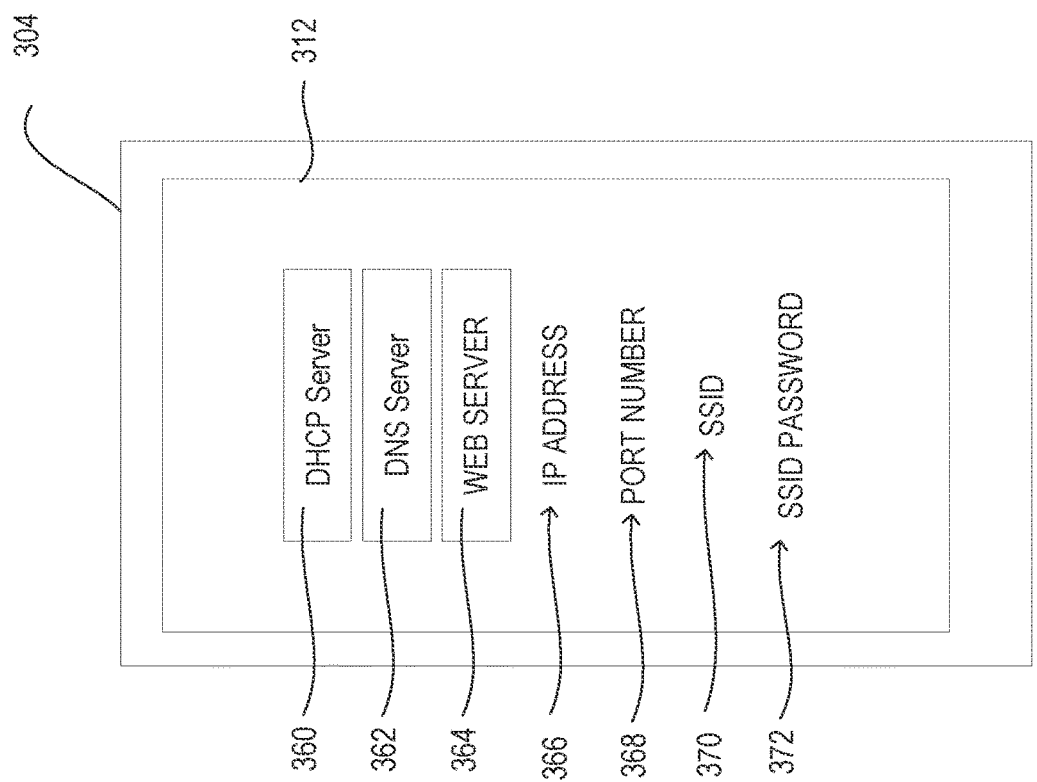

SEAMLESS CONNECTION TO MULTIPLE WIRELESS CONTROLLERS

CROSS-REFERENCE TO RELATED APPLICATIONS

This application is a continuation of U.S. application Ser. No. 17/215,684, filed Mar. 29, 2021; which is a continuation of U.S. application Ser. No. 15/466,239, filed on Mar. 22, 2017, now U.S. Pat. No. 10,965,639, issued Mar. 30, 2021; which claims the benefit of U.S. Provisional Patent Application No. 62/311,738, filed Mar. 22, 2016, the entire disclosures of which are incorporated by reference herein.

BACKGROUND

A load control environment, such as a residence or an office building, may be configured using various types of load control systems. The load control environment may include load control devices that are associated with input devices for communicating load control instructions for controlling an electrical load. The load control environment may include one or more rooms. Each of the rooms may include load control devices that are capable of directly controlling an electrical load. For example, each of the rooms may include lighting control devices (e.g., ballasts, LED drivers, or dimmer switches) capable of directly controlling an amount of power provided to lighting loads. A room may include additional load control devices, such as motorized window treatments and/or an HVAC system.

Each of the rooms may include input devices capable of indirectly controlling an electrical load by transmitting digital messages, which may include load control instructions, to a load control device. The input devices in the rooms may include remote control devices that may be mounted to the wall and that may send digital messages to the lighting control devices. The lighting control devices may control an amount of power provided to the lighting loads, based on the digital messages received from the remote-control devices.

The load control environment may also include multiple system controllers that may be dispersed throughout the environment. Each system controller may be configured to wirelessly communicate with one or more load control and input devices and in particular, may be configured to communicate with devices that are within communication range of the system controller. Each system controller also may be configured to wirelessly communicate with a computing device (such as a laptop computer or mobile phone) over a wireless communications network provided by the system controller. The wireless network provided by each system controller may be independent of the others. A user may wirelessly connect a computing device to each system controller via its respective wireless communications network and use the computing device to configure load control and input devices that are within range of the system controller. In other words, a user may need to connect to a first system controller via its respective wireless network to configure a first set of load control and input devices, and then connect to a second system controller via its respective wireless network to configure a second different set of load control and input devices.

Several problems may exist with this environment. For example, a user may connect a computing device to a system controller via the network provided by the system controller and begin configuring one or more devices. If during this configuration the user moves outside the range of the system controller's wireless network, or within range of another system controller's wireless network having a stronger signal, the user may lose contact with the original system controller and thus not be able to configure a set of devices. As another example, a user may wish to connect to a certain system controller to perform configurations on a set of devices and not be in range of the system controller's wireless network. As a user may need to walk around a load control environment to perform configurations, both example problems can make configuring the load control environment difficult.

SUMMARY

A load control system may include control devices for controlling an amount of power provided to an electrical load. The load control system may also, or alternatively, include one or more system controllers. The control devices may include control-source devices and/or control-target devices. The control-target devices may be load control devices capable of controlling the amount of power provided to a respective electrical load based on digital messages received from the control-source devices. The digital messages may include load control instructions or another indication that causes the control-target device to determine load control instructions for controlling an electrical load. One or more system controllers may communicate with control devices. For example, system controllers may communicate with control devices for configuring control devices, associating control devices, providing scenes (e.g., presets) via one or more control devices, etc. System controllers may communicate with control devices for operating control devices. For example, system controllers may communicate with control devices by generating instructions for control devices, sending instructions to control devices, and/or receiving instructions from control devices. System controllers may communicate with control devices by sending digital messages to the control devices wirelessly (e.g., via a proprietary communication channel, such as CLEAR CONNECT™, etc.).

As described herein, control-target devices and control-source devices may perform an association to communicate. A system controller may be used to perform the associations between the control-target devices and the control-source devices. For example, a system controller may be used to send digital messages to control-source devices for associating with control-target devices with the control-source source devices, and/or a system controller may be used to send digital messages to control-target devices for associating with control-source devices with the control-target devices. The digital messages may include an identification of the control-source devices and/or an identification of the control-target devices with which the system controllers may communicate. A control-source device may send digital messages to a control-target device for associating the control-target device with the control-source device, and the system controller may receive the digital messages and store information regarding the association between the control-target device with the control-source device.

Each of the system controllers may be capable of communicating with network devices (e.g., cell phones, smart phones, tablets, personal digital assistants, personal computers, laptops, etc.). For example, each of the system controllers may be capable of wirelessly communicating with network devices by sending digital messages on RF communication signals (e.g., WI-FI® signals, WI-MAX® signals, etc.). The system controllers may each provide their own independent wireless connection (e.g., network) to the network devices.

As the network device moves within a load control environment, signal strengths of signals received by the network device from the system controllers may vary. For example, as a user moves throughout a load control environment, the network device may determine strengths of received signals from one or more system controllers. The network device may determine that the strength of a received signal may increase as the network device approaches the location of a system controller transmitting the corresponding signal. On the contrary, the network device may determine that the strength of a signal from a system controller may decrease as the network device moves farther away from the location of the corresponding system controller.

In a load control environment including more than one system controller, the network device may connect with the system controller according to a signal strength of a wireless signal received by the network device. For example, a network device may receive one or more signals from one or more system controllers. The network device may determine a strength of one or more of the signals received by the network device. The network device may connect with the system controller corresponding to the signal at which the network device receives the strongest signal. For example, if a network device is moving away from a system controller in which the network device is connected, and the network device is moving towards a system controller in which the network device is disconnected, the network device may disconnect from the one system controller and connect with the other system controller. The network device may disconnect from the one system controller and connect with the other system controller when the network device determines that the network device is receiving a signal strength of the other system controller that is stronger than the signal strength of the one system controller in which the network device was connected. Additional factors (such as obtrusions between the network device and the system controller), may affect the strength of the signal received by the network device. For example, metal shelving positioned between a network device and a system controller may cause the strength of the signal received by the network device to be affected (e.g., reduced).

As provided herein, the network device may communicate with one or more system controllers by sending digital messages to/receiving digital messages from the system controllers wirelessly (e.g., via BLUETOOTH®; WI-FI®, etc.). A system controller that directly wirelessly communicates with a network device may be referred to as a gateway system controller. A system controller that does not directly wirelessly communicate with a network device may be referred to as a remote system controller. A system controller that communicates with a network device via a gateway system controller may be referred to as a target system controller. A target system controller may be a gateway system controller and/or a remote system controller. One or more system controllers (e.g., one or more gateway system controllers, target system controllers, and/or remote system controllers) may be coupled to one or more other system controllers via a wired communication link. The wired communication link may be a secure link. The system controllers may be on-site at the load control environment or at remote locations. The link may connect the system controllers to a network switch, which may in turn connect the system controllers to a router. The router may connect the system controllers and/or the switch to the Internet.

The network device may be capable of sending/receiving digital messages to/from a target system controller via one or more gateway system controllers. For example, a network device may be wirelessly connected to a gateway system controller, and the network device may send digital messages to the target system controller. The network device may be connected to a gateway system controller, and the network device may send digital messages to a target system controller via the gateway system controller to which the network device is wirelessly connected. In other words, the network device may send digital messages to the gateway system controller to which the network device is wirelessly connected, and the gateway system controller may forward the digital messages to the target system controller via a wired communication link. Thus, the network device may send digital messages to a system controller (e.g., the network device may send digital messages to a system controller independent of which system controller the network device is wirelessly connected). Similarly, the network device may receive digital messages from the target system controller via the gateway system controller (i.e., the gateway system controller may forward digital messages from the target system controller to the network device). The sending/receiving of digital messages to/from one or more of the system controllers may be seamless to the user of the network device. For example, the network device may seamlessly switch wireless connections among gateway system controllers when sending/receiving digital messages to respective gateway system controllers. Also, or alternatively, the gateway system controller may seamlessly switch among target system controllers when sending/receiving digital messages to respective target system controllers.

Because the communication between the network device and system controllers (e.g., gateway system controllers and/or target system controllers) may be seamless to the user, the load control system may be installed without the need to contact the information technology (IT) department of the load control environment. Further, because the communication between the network device and system controllers may be seamless to the user while configuring and/or operating the system controllers, the configuration procedure and/or operation of the system controllers is simple. For example, the network device may provide the user with a graphical user interface providing the user with a listing of system controllers with which the network device may communicate. The user may select a desired system controller with which to communicate, and the user may configure and/or operate the desired system controllers. The user may configure and/or operate the system controllers independent of the location of the user and/or independent of the location of the desired system controllers.

As the strengths of signals received by the network device from one or more of the system controllers may change (e.g., as the network device is moved throughout the load control environment), the network device may switch wireless connections between system controllers, while maintaining a connection to a target system controller for configuration. Although the wireless connection between the network device and system controllers may change, the digital messages may continue to be sent/received (e.g., forwarded) to/from a target system controller independent of which system controller the network device is wirelessly connected.

The network device may seamlessly communicate with one or more system controllers. The network device may switch between wireless connections to system controllers (e.g., gateway system controllers) without identifying with which system controller the network device is wirelessly communicating. Thus, the transfer of wireless communication from one system controller to another system controller may be seamless to the user of the network device. The transfer of the wireless communication may be seamless to the user, due to the system controllers sharing a service set identifier (SSID) and/or SSID password.

An SSID may be a name (e.g., the primary name) associated with a wireless local area network (WLAN) within a load control system. For example, a network device may use an SSID to identify system controllers within the load control system and/or to join system controllers within the load control system. The SSID may be a sequence of alphanumeric characters (e.g., letters and/or numbers) with a length of 32 characters or less. As provided herein, the network device may connect to one or more system controllers, e.g., based on the signal strength received by the network device and transmitted by a system controller. The network device may connect to the system controllers by scanning the load control system for system controllers broadcasting their SSIDs. The system controllers may use a common SSID. Each of the system controllers using a common SSID may be connected with one another for communication. For example, each of the system controllers using a common SSID may be connected with one another via a wired link (e.g., a network communication link). The wired link may be a secured link for communications (e.g., provide for secure communications) between the system controllers. The wired link may allow the system controllers to communicate prior to the local area network (LAN) of the load control environment being configured. For example, the wired link may allow the system controllers to communicate with control devices, network devices, and/or other system controllers prior to the LAN of the load control environment being configured.

When wirelessly connecting with a gateway system controller, the network device may use the SSID broadcasted from the gateway system controller. If the network device locates another system controller that broadcasts a wireless signal that is stronger than the first gateway system controller, the network device may disconnect from the system controller in which the network device receives the weaker signal and connect with the system controller in which the network device receives the stronger signal. When connecting with the system controller in which the network device receives the stronger signal, the system controller in which the network device is connected may be the gateway system controller. The network device may use a common SSID and/or SSID password to wirelessly connect with the system controllers (e.g., gateway system controller). When the network device connects to the gateway system controller, the gateway system controller may forward digital messages received from the network device. The gateway system controller may forward the digital messages to a target system controller, or to the gateway system controller itself (e.g., via a loop back technique). Similarly, the network device may receive digital messages from the target system controller via the gateway system controller (i.e., the gateway system controller may forward digital messages from the target system controller to the network device). The connection to the gateway system controller, and the forwarding of the digital messages to/from the target system controller, may be performed without the knowledge of the user of the network device (e.g., the connection to the gateway system controller, and/or the forwarding of the digital messages to/from the target system controller, may be performed seamlessly).

The gateway system controller may forward the digital messages between the network device and target system controller using, for example, a port forwarding technique. The port forwarding technique may redirect a communication request from one address and port number to another address and port number. The port forwarding technique may be implemented using mapping information. For example, mapping information may include information for mapping wired communication addresses from devices (e.g., system controllers, switches, and/or routers) with wireless communication addresses from devices (e.g., control devices and/or network devices).

Mapping information may include a wired address column that includes a list of wired addresses for wired devices. For example, wired address column may include wired IP address of the devices, such as IP addresses 10.10.0.1, 10.10.0.2, 10.10.0.3, 10.10.0.4, etc. The wired addresses may correspond to a system controller on the secure link. The wired addresses may include a port number of the services to be accessed at the device, such as port number 80. The port number of the device may be provided in addition to the wired IP address of the device. The port number may be appended to the wired IP address. For example, the wired IP address of the device may be 10.10.0.1.80, which may include the IP address 10.10.0.1 of the device, along with the device's port number 80.

Mapping information may include a wireless address column that provides a list of wireless devices addresses. Wireless addresses may include a wireless IP address of the devices, such as 192.168.3.1. The wireless IP addresses included in the wireless address column may be the same for all devices. Wireless address column may include a wireless port number of the device, such as port number 8444. Each of the port numbers included in the wireless address column may be different for each device. The port number of the device may be provided in addition to, or, in the alternative of, the wireless IP address of the device. The port number may be appended to the IP address. For example, the wireless IP address may be 192.168.3.8444, which may include the wireless IP address 192.168.3 of the device, along with the device's port number 8444.

Mapping information may provide a correlation between devices provided in wireless address column and devices provided in wired address column. For example, the devices within a row of the mapping information may be correlated (e.g., mapped) to one another, via respective addresses (e.g., IP addresses and/or port numbers). For example, each row of the mapping information may include wireless device information that correlates with wired device information. System controllers may have mapping information stored thereon for performing port forwarding of digital communications received from network devices. The mapping information may be used by the system controllers to seamlessly provide configuration of a system controller while the network device is switching between different wireless networks. The system controllers may seamlessly forward wireless communications from a network device to another system controller, or to the system controller itself, for processing and similarly, may forward communications from the another system controller (or the controller itself) to the network device.

For example, when a network device sends a digital message to a system controller (e.g., a system controller having an address and port number) via a wireless connection, the port forwarding technique may be used to redirect the digital message to another system controller (e.g., another system controller having an address and port number) via the wired communication link. Each of the system controllers may have a common IP address (e.g., a same IP address). Each of the system controllers may have a different port number. Using a port forwarding technique, a system controller may receive a digital message from a network device and redirect (e.g., forward) the received digital message to one or more other system controllers within a network. If the port number maps to the system controller receiving the digital messages wirelessly from the network device, the system controller may forward the digital message to itself. The system controller may also forward a digital message received from a system controller to the network device.

The network device may define an organized dataset of the system controllers having a common SSID. The dataset may be organized according to the signal strengths at which the network device receives messages from each respective system controller, and/or the dataset may be organized according to the locations of the system controllers (e.g., the locations of the system controllers with respect to the network device). System controllers may be added to and/or removed from the dataset. The network device may generate a user interface that includes the organized dataset, and/or a portion of the organized dataset. The user interface may allow a user to communicate with a particular system controller, independent of whether the network device is wirelessly connected to the system controller.

The user interface may allow a user to communicate with a particular system controller for configuration purposes, independent of whether the network device is wirelessly connected to that system controller. For example, the user may configure target system controllers via communications sent from a network device and forwarded from a gateway system controller. As provided herein, a target system controller may be a gateway system controller. Thus, the user may configure gateway system controllers via communications sent from a network device and forwarded (e.g., via a loop back technique) from the gateway system controller. A user may select, via a user interface provided by the network device, the target system controller that the user desires to configure. Upon selecting the desired target system controller, the user may be presented with load control devices (e.g., control-source devices and/or control-target devices) that may be configured by the selected target system controller.

The system controller (e.g., the target system controller) may generate and/or store information in the form of a table or database that defines the operation, identity, and/or position of the control devices within a predefined range (e.g., within a predefined range of the target system controller). Thus, the system controller may generate a table or database of control devices that the target system controller may communicate with using a proprietary RF protocol, such as CLEAR CONNECT™. The table or database may be useful for displaying and/or selecting control devices positioned within the predefined range of the target system controller. For example, the table or database may be presented to the user, and the user may select control devices from the table or database that may be configured by the selected target system controller. This may reduce the possibility of errors when a user is selecting control devices to configure, because control devices that may not be configured (e.g., due to being out of range) may not be provided to the user.

The user may select the load control devices that the user desires to configure (e.g., associate) with the target system controller. The user may select the load control devices that the user desires to configure (e.g., associate) with the target system controller, independent of the location of the network device. For example, the user may be proximate to a gateway system controller. The user may not be proximate to a target system controller and load control devices that may be associated with the target system controller. Although the user and the network device may not be proximate to the target system controller, the user may associate the target system controller with the load control devices. The gateway system controller may change as the user is associating the target system controller and the load control devices. Independent of which system controller is the gateway system controller, the user may continue to communicate with the target system controller (e.g., gateway system controller, remote system controller, etc.) to associate the target system controller with load control devices. It may be unnoticeable to the user of the network device which system controller is the gateway system controller.

The gateway system controller may be the target system controller. For example, the network device may begin wireless communications with a first system controller (e.g., the gateway system controller). The first system controller (e.g., the gateway system controller) may forward digital communications from the network device to a second system controller (e.g., the target system controller) and vis versa. The network device may later disconnect from the first system controller and the network device may connect with another system controller. The other system controller, with which the network device connects, may be the second system controller or a third system controller. The other system controller would be the gateway system controller. Thus, the gateway system controller may be the target system controller or the gateway system controller may be another system controller. The user of the network device may be able to configure target system controllers without knowing which system controller the network device is wirelessly communicating with, and/or which system controllers are remote from the network device. This may decrease opportunities for error when configuring system controllers and/or when associating system controllers with load control devices. Thus, specialized technicians may not be necessary when configuring system controllers and/or associating system controllers with load control devices. As a result, configuring system controllers and/or associating system controllers with load control devices may be more efficient and provide time and cost savings.

The above advantages and features are of representative embodiments only. They are not to be considered limitations. Additional features and advantages of embodiments will become apparent in the following description, from the drawings, and from the claims.

BRIEF DESCRIPTION OF THE DRAWINGS

FIGS. 3A-3D are system diagrams of example system controllers of a load control system.

DETAILED DESCRIPTION

Figure 1A:
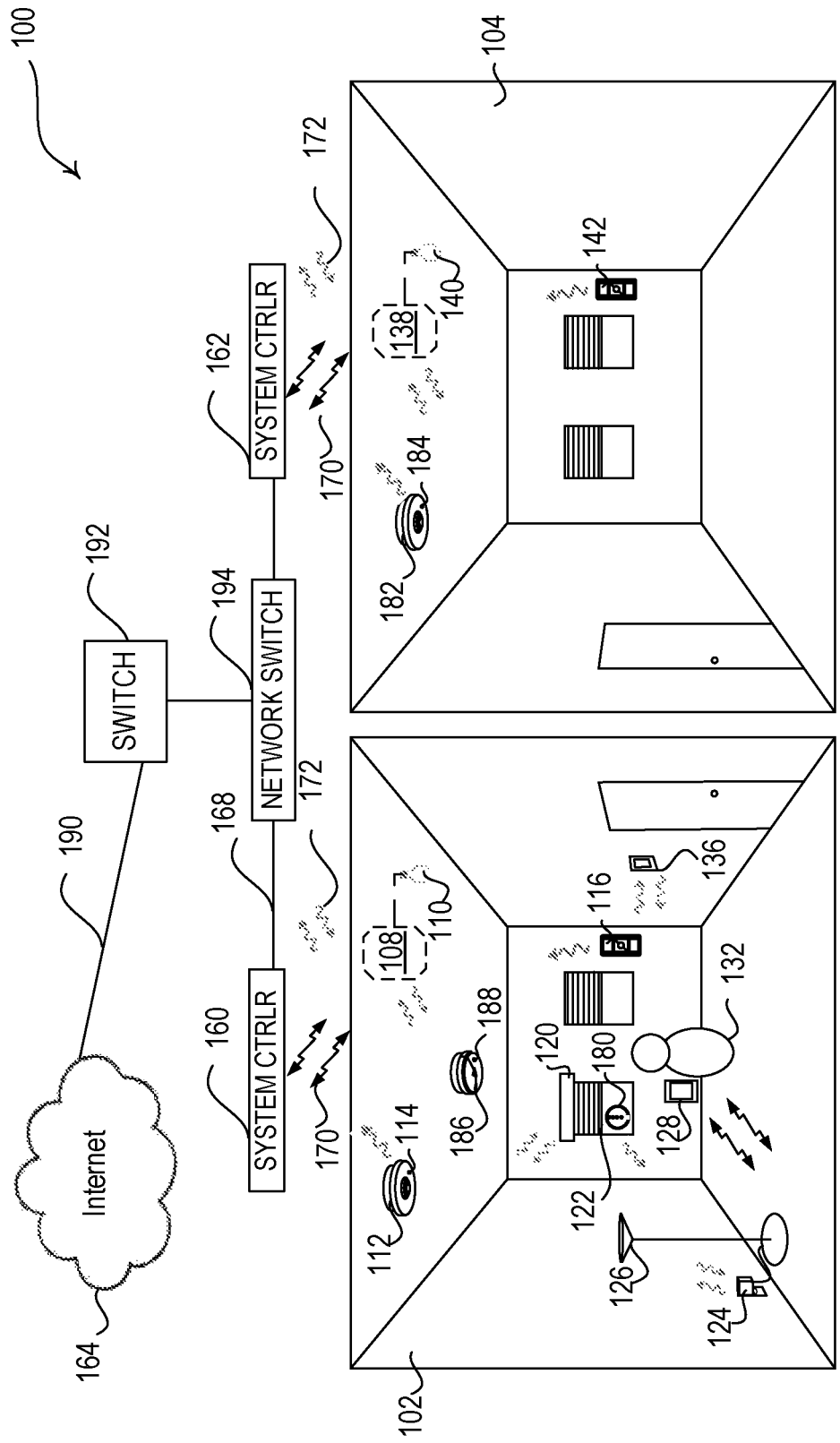
FIGS. 1A-1B are perspective views of example environments for associating control devices.

FIG. 1A depicts a representative load control environment 100 for configuring control devices, which may include control-source devices and/or control-target devices. FIG. 1A may further depict a representative load control environment 100 for operating system control devices. Configuring control devices may include associating one or more control devices with one or more other control devices. For example, a control-target device (e.g., a dimmer switch) may be associated with a control-source device (e.g., a lighting load). By associating a respective control-source device and control-target device, the control-source device may communicate with the control-target device to indirectly control a respective electrical load. Configuring control devices may also, or alternatively, include providing one or more scenes (e.g., presets) using the control devices. For example, one or more control devices may be configured to provide a meeting scene, a bedtime scene, etc. Operation of system controllers may include generating control instructions to control devices, sending digital signals (e.g., digital signals representing control instructions) to control devices, receiving digital signals from control devices, etc.

As shown in FIG. 1A, rooms 102, 104 in a building may be installed with one or more control-target devices, e.g., load control devices for controlling the electrical loads within a room or building. Rooms 102, 104 may be proximate to one another, or rooms 102, 104 may not be proximate to one another. For example, room 102 may be located on one floor and room 104 may be located on another floor. Rooms 102, 104 may be on the same floor, and/or rooms 102, 104 may be on opposite sides of the floor.

Each load control-target device may be capable of directly controlling the amount of power provided to an electrical load and may be controlled by a control-source device. Example control-target devices may include lighting control devices 108, 138 (e.g., ballasts, LED drivers, or dimmer switches) for controlling the amount of power provided to lighting loads 110, 140, respectively, a motorized window treatment 120 having a motor drive unit (e.g., including a motor) for controlling the position of covering material 122, a temperature control device (e.g., thermostat 136) for controlling an HVAC system, and/or an AC plug-in load control device 124 for controlling a plug-in electrical load, such as floor lamp 126, a table lamp, or another electrical device that is plugged in to the AC plug-in load control device 124.

Control devices (e.g., a control-source device and/or a control-target device) may communicate with each other and/or other devices via a wired and/or a wireless signal. For example, the control devices may communicate via a radio frequency (RF) signal 172. The RF signal 172 may be presented via any known RF communication (e.g., near field communication (NFC); BLUETOOTH®; WI-FI®; a proprietary communication channel, such as CLEAR CONNECT™, etc.). A control device may be both a control-target and a control-source device.

A control-source device may indirectly control the amount of power provided to an electrical load by transmitting digital messages to the control-target device. The digital messages may include control instructions (e.g., load control instructions) or another indication that causes the control-target device to determine load control instructions for controlling an electrical load. Example control-source devices may include remote-control devices 116, 142, occupancy sensors 112, 182, and/or a daylight sensor 186. The control-source devices may include a wired or wireless device. The control-source devices may include a control device, such as a dimmer switch, an electronic switch, or the like.

The remote-control devices 116, 142 may be wireless devices capable of controlling a control-target device via wireless communications. The remote-control devices 116, 142 may be attached to the wall or detached from the wall. Examples of remote control devices are described in greater detail in U.S. Pat. No. 5,248,919, issued Sep. 29, 1993, entitled LIGHTING CONTROL DEVICE; in U.S. Pat. No. 8,471,779, issued Jun. 25, 2013, entitled COMMUNICATION PROTOCOL FOR A RADIO-FREQUENCY LOAD CONTROL SYSTEM; and in U.S. Patent Application Publication No. 2014/0132475, published May 15, 2014, entitled WIRELESS LOAD CONTROL DEVICE, the entire disclosures of which are hereby incorporated by reference.

The occupancy sensors 112, 182 may be configured to detect occupancy and vacancy conditions in the load control environment 100 in which the load control system is installed. The occupancy sensors 112, 182 may transmit digital messages to control-target devices via the RF communication signals 172 in response to detecting the occupancy or vacancy conditions. The occupancy sensors 112, 182 may operate as a vacancy sensor, such that digital messages are transmitted in response to detecting a vacancy condition (e.g., digital messages may not be transmitted in response to detecting an occupancy condition). The occupancy sensors 112, 182 may enter an association mode and may transmit association messages via the RF communication signals 172 in response to actuation of respective buttons 114, 184 on the occupancy sensors 112, 182. Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; in U.S. Pat. No. 8,199,010, issued Jun. 12, 2012, entitled METHOD AND APPARATUS FOR CONFIGURING A WIRELESS SENSOR; and in U.S. Pat. No. 8,228,184, issued Jul. 24, 2012, entitled BATTERY-POWERED OCCUPANCY SENSOR, the entire disclosures of which are hereby incorporated by reference.

The daylight sensor 186 may be configured to measure a total light intensity in the load control environment 100 in which the load control system is installed. The daylight sensor 186 may transmit digital messages including the measured light intensity via the RF communication signals 172 for controlling control-target devices in response to the measured light intensity. The daylight sensor 186 may enter an association mode and may transmit association messages via the RF communication signals 172 in response to actuation of a button 188 on the daylight sensor 186. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and in U.S. Pat. No. 8,451,116, issued May 28, 2013, entitled WIRELESS BATTERY-POWERED DAYLIGHT SENSOR, the entire disclosures of which are hereby incorporated by reference.

The window sensor 180 may be configured to measure an exterior light intensity coming from outside the load control environment 100 in which the load control system is installed. The window sensor 180 may be mounted on a façade of a building, such as the exterior or interior of a window, to measure the exterior natural light intensity depending upon the location of the sun in the sky. The window sensor 180 may detect when direct sunlight is directly shining into the window sensor 180, is reflected onto the window sensor 180, or is blocked by external means, such as clouds or a building, and may send digital messages indicating the measured light intensity. The window sensor 180 may transmit digital messages including the measured light intensity via the RF communication signals 172. The digital messages may be used to control an electrical load via one or more control-target devices. The window sensor 180 may enter an association mode and may transmit association messages via the RF communication signals 172 in response to actuation of a button on the window sensor 180.

The load control environment 100 may include other types of control-source devices, such as, for example, temperature sensors, humidity sensors, radiometers, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, cell phones, smart phones, tablets, personal digital assistants, personal computers, laptops, timeclocks, audiovisual controls, safety devices, power monitoring devices (e.g., power meters, energy meters, utility submeters, utility rate meters, etc.), central control transmitters, residential controllers, commercial controllers, industrial controllers, or any combination of input devices.

The load control environment 100 may include one or more system controllers (such as system controllers 160, 162) operable to transmit and/or receive digital messages via wired and/or wireless communications. For example, system controllers 160, 162 may be configured to transmit and/or receive the RF communication signals 172, to communicate with one or more control devices (e.g., control-source devices and/or control-target devices). The system controllers 160, 162 may be coupled to one or more wired control devices (e.g., other system controllers, switch 194, etc.) via a wired digital communication link 168. The wired communication link 168 may be a secure link. The system controllers 160, 162 may be on-site at the load control environment 100 or at a remote location. As provided herein, the load control environment 100 may include multiple system controllers, and/or the functionality thereof may be distributed across multiple devices.

The link 168 may connect the system controllers 160, 162 to a network switch 194. The network switch 194, which may be referred to as switch 194, may be a networking device that connects other devices (e.g., system controllers 160, 162) together on a computer network. The switch 194 may connect the system controllers 160, 162 together by using packet switching to receive, process, and/or forward data (e.g., digital messages) to one or more destination devices. For example, switch 194 may connect the system controllers 160, 162 together by using packet switching to receive, process, and/or forward data to one or more other system controllers. The switch 194 may forward data to the one or more system controllers that need to receive the data.

The switch 194 may be connected to a router 192. The router 192 may link the switch 192 and/or the system controllers 160, 162 to the Internet 164. The router 192 may be connected to the Internet 164 via an Internet link 190. The router 192 may link the switch 194 and/or the system controllers 160, 162 to the Internet 164 so that data from the system controllers 160, 162 may be shared with devices connected to the Internet 164 and/or so that the system controllers 160, 162 may receive data from devices connected to the Internet 164. For example, data from the system controllers 160, 162 may be sent to, and/or shared with, a cloud service provided by the Internet 164. Data from the system controllers 160, 162 may be sent to, and/or shared with, external servers for providing access to users beyond the local area network.

The system controllers 160, 162 may communicate via RF communication signals 170 (e.g., NFC; BLUETOOTH®; WI-FI®; cellular; a proprietary communication channel, such as CLEAR CONNECT™, etc.), respectively. The system controllers 160, 162 may communicate over the Internet 164, or other network, using RF communication signals 170. The RF communication signals 170 may be transmitted using a different protocol and/or wireless band than the RF communication signals 172. For example, the RF communication signals 170 may be transmitted using WI-FI® or cellular signals and the RF communication signals 172 may be transmitted using another RF communication protocol, such as BLUETOOTH® or a proprietary communication protocol. The RF communication signals 170 may be transmitted using the same protocol and/or wireless band as the RF communication signals 172. For example, the RF communication signals 170 and the RF communication signals 172 may be transmitted using WI-FI® or a proprietary communication protocol.

The system controllers 160, 162 may be configured to transmit and receive digital messages between control devices. The system controllers 160, 162 may transmit digital messages to the control-target devices in response to the digital messages received from the control-source devices. For example, the digital messages may include association information for being stored at the control devices or control instructions for controlling an electrical load. The control instructions may be used to control the electrical load of a control-target device or to control the electrical load according to control configuration information. The system controllers 160, 162 may receive control instructions from a control-source device and may perform a lookup of the control-target devices associated with the control-source device. The system controllers 160, 162 may send digital messages that include control instructions to the associated control-target devices for controlling electrical loads.

The system controllers 160, 162 may generate and/or store information in the form of a table or database that defines the operation, identity, and/or position of the control devices within a predefined range (e.g., within a predefined range of the system controllers 160, 162). The system controllers 160, 162 may generate a table or database of control devices that the system controllers 160, 162 may communicate with using a proprietary RF protocol, such as CLEAR CONNECT™ The table or database may be useful for displaying and/or selecting control devices positioned within predefined ranges of the respective systems controllers 160, 162. For example, the table or database may be presented to the user, and the user may select control devices from the table or database that may be configured by the system controllers 160, 162. This may reduce the possibility of errors when a user is selecting control devices to configure, because control devices that may not be configured (e.g., due to being out of range) may not be provided to the user.

Once a control-source device is associated with a control-target device, the control-source device may send digital messages to the control-target device to cause the control-target device to control an amount of power provided to an electric load. For example, the associated remote control device 116 may instruct the lighting control device 108 to increase or decrease the lighting level of the lighting load 110, instruct the motorized window treatment 120 to raise or lower the covering material 122, instruct the AC plug-in load control device 124 to raise or lower the lighting level of the floor lamp 126, and/or instruct the temperature control device 136 to raise or lower the temperature in one or more rooms. The associated occupancy sensor 112 may send similar instructions to a control-target device based on the detection of movement or occupancy within the room 102. The daylight sensor 186 may send similar digital messages to a control-target device based on the detection of natural light within the room 102.

The control devices may perform association with the system controllers 160, 162. The control devices may send an association message to the system controllers 160, 162 and/or the system controllers 160, 162 may send an association message to the control devices. An identifier of the system controllers 160, 162 may be stored at the control devices for detecting communications from the system controllers 160, 162.

The system controllers 160, 162 may include control configuration information according to which one or more control-target devices may be controlled. For example, control configuration information may include preset configurations. The system controllers 160, 162 may generate digital messages according to the preset configurations to set a dimming level of the lighting loads 110, 140 to a predefined level, to set a level of the covering material 122 to a predefined level, to set a dimming level of the lamp 126 to a predefined level, or to set a temperature of the temperature control device 136 to a predefined level. Different presets may be configured to control different control-target devices to control a corresponding electrical load differently. Example preset configurations may include bedtime preset for when a user is going to bed, a movie watching preset for when a user is watching television or a movie, an away preset for when a user is away from the building, a home preset for when the user is in the building, or other preset configurations a user may define for an occasion.

The control configuration information may include zone configurations. The zone configurations may define one or more zones in which a control-target device is defined for being controlled. The zones may be a group of control devices for being associated that have a group identifier. The control-target devices in different zones may be separately controlled by sending digital messages having control instructions for controlling each zone. Different zones may be identified by a zone identifier (e.g., group identifier) that may be stored at the system controllers 160, 162 and/or the control devices in the zone. Each zone may be defined as a location having a zone identifier that is a location identifier. Though the zone may be described herein as a location having a location identifier, other zone configurations may be similarly implemented as described herein for locations.

The load control environment 100 may include a network device 128. The network device 128 may perform wired and/or wireless communications. Examples of the network device 128 may include a wireless phone, a tablet, a laptop, a personal digital assistant (PDA), a wearable device (e.g., a watch, glasses, etc.), or another computing device. The network device 128 may be a user device operated by a user 132. The network device 128 may communicate wirelessly by sending digital messages on RF communication signals 170 (e.g., WI-FI® signals, WI-MAX® signals, etc.). The network device 128 may communicate digital messages in response to a user actuation of one or more buttons on the network device 128. Examples of load control systems having WI-FI®-enabled devices, such as smart phones and tablet devices, are described in greater detail in commonly-assigned U.S. Patent Application Publication No. 2013/0030589, published Jan. 31, 2013, entitled "Load Control Device Having Internet Connectivity," and in U.S. Patent Application Publication No. 2014/0177469, filed Mar. 12, 2013, entitled "Network Access Coordination Of Load Control Devices," the entire disclosures of which are incorporated herein by reference.

The network device 128 may communicate with the system controllers 160, 162 using digital messages transmitted via RF communication signals 170 (e.g., WI-FI® signals, WI-MAX® signals, etc.) to allow the network device 128 to associate control devices (e.g., control-source devices and/or control-target devices) and/or control electrical loads. When the RF communication signals 170 and the RF communication signals 172 communicate on the same communication protocol and/or the same band, the network device 128 may operate as the system controller 160, 162.

The network device 128 may generate an application locally for displaying information received from the system controllers 160, 162 and/or receiving user input for communicating information to the system controllers 160, 162. The system controllers 160, 162 may be accessed from the network device 128 via a web interface (e.g., accessible via a web browser or other application at the network device 128), for example. The user 132 may generate and store association information on the network device 128 for associating control-source devices and control-target devices.

The association information may be stored in the form of a table or database that associates a unique identifier (e.g., serial number) of a control-target device with a location and/or a unique identifier (e.g., serial number) of one or more control-source devices. The association information may include a device type identifier that indicates a device type of the control-target device (e.g., lighting control device, motorized window treatment, plug-in load control device, temperature control device, etc.) and/or a device type of the control-source devices (e.g., remote control device, occupancy sensor, daylight sensor, window sensor, etc.). The association information may be sent from the network device 128 to the system controllers 160, 162. The system controllers 160, 162 may store the association information. The system controllers 160, 162 may identify the association information corresponding to each control-target device by identifying the unique identifier of the control-target device and the corresponding associated devices (e.g., unique identifiers of the control-source devices) to transmit the association information to each control-target device for storage thereon. The system controllers 160, 162 may identify other information, such as control configuration information, corresponding to each control-target device and may transmit the information to each control-target device for storage thereon, such that the control-target devices may respond according to the information.

The network device 128 may provide the system controllers 160, 162 for display to the user 132. The network device 128 may organize the system controllers 160, 162 for display to the user 132 for performing association. The network device 128 may organize the system controllers in an organized dataset (e.g., ascending or descending list) that may be organized by the strength at which the network device 128 receives signals from the system controllers. The network device 128 may remove any system controllers from the dataset that has a received signal strength that is below a predefined threshold (e.g., a reception power threshold). The network device 128 may include a predefined number of system controllers in the dataset that have the greatest received signal strengths. The network device 128 may display the organized dataset to the user 132.

The user 132 may configure association information and/or control configuration information for control devices at the network device 128. The control devices may be associated with one or more location identifiers that identify locations in the load control environment 100. The locations may be identified by the user 132 (e.g., from a list of predefined locations).

The network device 128 may access the association information stored at one or more of the system controllers 160, 162. The association information may include device identifiers of the associated control devices, location identifiers of the associated control devices, etc. The user 132 may disassociate control devices from previously associated control devices by making selections on the network device 128. The user 132 may associate control devices with other control devices by making selections on the network device 128.

The user 132 may access the control configuration information stored at one or more of the system controllers 160, 162. The user 132 may edit currently stored control configuration information for control devices by making selections on the network device 128. The user 132 may generate and store control configuration information for control devices by making selections on the network device 128.

The network device 128 may transmit the association information and/or control configuration information to respective ones of the system controllers 160, 162 (e.g., upon actuation of a button by the user 132). The respective system controllers 160, 162 may store the updated association information and/or control configuration information thereon. The system controllers 160, 162 may transmit the association information and/or control configuration information to the control devices to update the association information and/or control configuration information stored at the control devices. The system controllers 160, 162 may broadcast the updated association information and/or control configuration information to the control devices for the control devices to identify updated corresponding association information and/or control configuration information, if any, for being stored locally thereon.

The user 132 may use network device 128 to wirelessly communicate with system controller 160 and/or system controller 162. Each system controller 160 may provide a wireless network (e.g., IP (internet protocol) network) with which the network device 128 may connect. Network device 128 may establish a wireless connection with one system controller at a time. For example, if network device 128 is wirelessly connected to system controller 160, network device may be disconnected from system controller 162. If network device 128 is connected to system controller 160 according to a received signal strength, for example, and network device 128 determines that a stronger signal may be provided via another system controller (e.g., system controller 162), network device 128 may disconnect from system controller 160 and thereafter connect with the other system controller (e.g., system controller 162). The disconnection from system controller 160 and connection to system controller 164 may be seamless to the user 132.

The network device 128 may seamlessly connect and disconnect to the wireless networks provided by the system controllers 160, 162, as the system controllers 160, 162 may provide independent wireless networks having a common SSID (service set identifier) and/or SSID password. The network device 128 may identify the common SSID and connect to the system controllers 160, 162 seamlessly using the common SSID and/or SSID password as the user 132 moves around the load control environment 100.

Figure 1B:
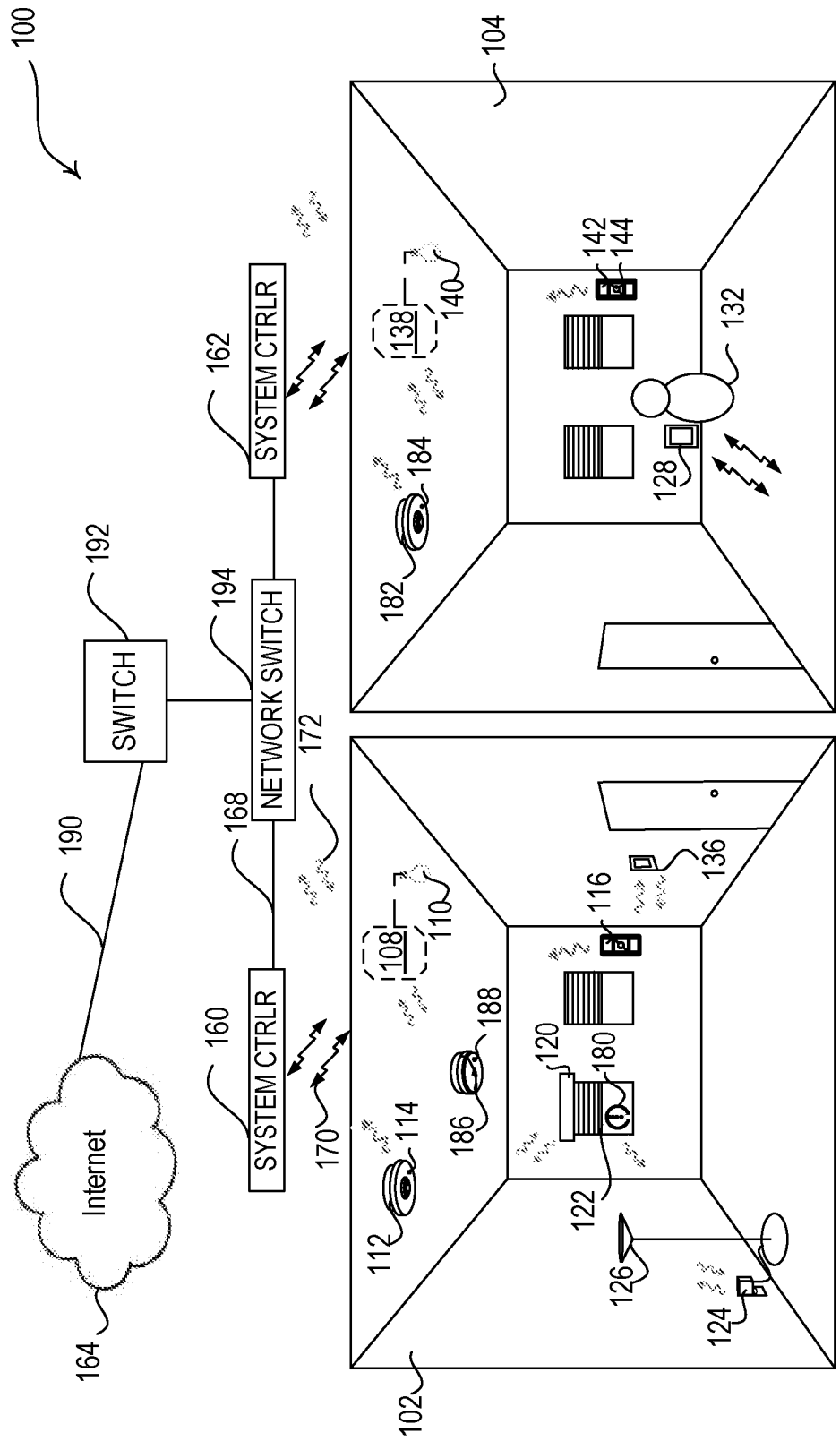

FIG. 1B shows the example load control environment 100 where the user 132 moves from room 102 (shown in FIG. 1A) to room 104. A user 132 may move from one room to another room for various reasons. For example, a user 132 may be inspecting rooms within a load control system, may be associating load control devices within rooms of a load control system, etc. As the user moves from one location to another location, the network device 128 may disconnect from one system controller and connect to another system controller. For example, as the user moves from room 102 to room 104, the network device 128 may disconnect from system controller 160 and may connect to system controller 162. The wireless connection to the networks provided by the system controllers 160, 162 may be established using the same SSID and/or password. As provided herein, the disconnection from system controller 160 and connection to system controller 164 may be unnoticeable to the user 132.

The user may desire to communicate with a system controller that is different than the system controller in which the network device is wirelessly connected. For example, the user 132 may be located in room 102 (as shown in FIG. 1A), and the user 132 may be wirelessly connected with system controller 160. The user may move to room 104 (as shown in FIG. 1B). Upon the user moving from room 102 to room 104, the user may be wirelessly connected with system controller 162. Independent of the system controller in which the network device 128 is wirelessly connected the user 132 may desire to continue sending digital signals to/receiving signals from system controller 160. Thus, the user may desire to be wirelessly connected to a system controller, which may be referred to as a gateway system controller, while establishing and/or maintaining a connection to another system controller, which may be referred to as a target system controller. A system controller that does not directly wirelessly communicate with a network device may be referred to as a remote system controller. A target system controller may be a gateway system controller and/or a target system controller may be a remote system controller. For example, the gateway system controller may be the same device as the target system controller when the user is accessing the gateway system controller wirelessly and configuring the load control system on the system controller. As provided herein, the user may communicate with a gateway system controller, and the gateway system controller may forward digital messages to the target system controller and vis versa. For example, the gateway system controller may forward the digital messages to/receive digital messages from the target system controller via a port forwarding technique.

As an example, a user 132 having a network device 128 may be in room 102. The network device 128 in room 102 may be connected to system controller 160. The system controller 160 may be referred to as a gateway system controller. The user may desire to communicate digital messages with system controller 160 for performing system configuration. The system controller 160 may be referred to as a target system controller. Thus, the system controller 160 may be the gateway system controller and the target system controller. As shown in FIG. 1B, the user 132 may move to room 104. As the user moves to room 104, the network device 128 may disconnect from the wireless network provided by system controller 160 and the network device 128 may connect to the wireless network provided by system controller 162. The system controller 162 may be established as the gateway system controller upon connection of the network device to the system controller 162. If the user desires to send digital messages to system controller 160, the gateway system controller may be system controller 162, and the target system controller may be system controller 160. The network device 128 may send digital messages to gateway system controller (e.g., system controller 162), and the gateway system controller (e.g., system controller 162) may seamlessly pass the digital messages (e.g., forward the digital messages) to the target system controller (e.g., system controller 160) as described herein. Similarly, the target system controller may send digital messages back to the network device via the gateway system controller. This may allow the network device to maintain the connection to the system controller 160 for performing configuration of control devices at the system controller 160, while the user 132 moves around the load control environment 100 and/or the network device 128 establishes connections to different wireless networks.

Figure 2:
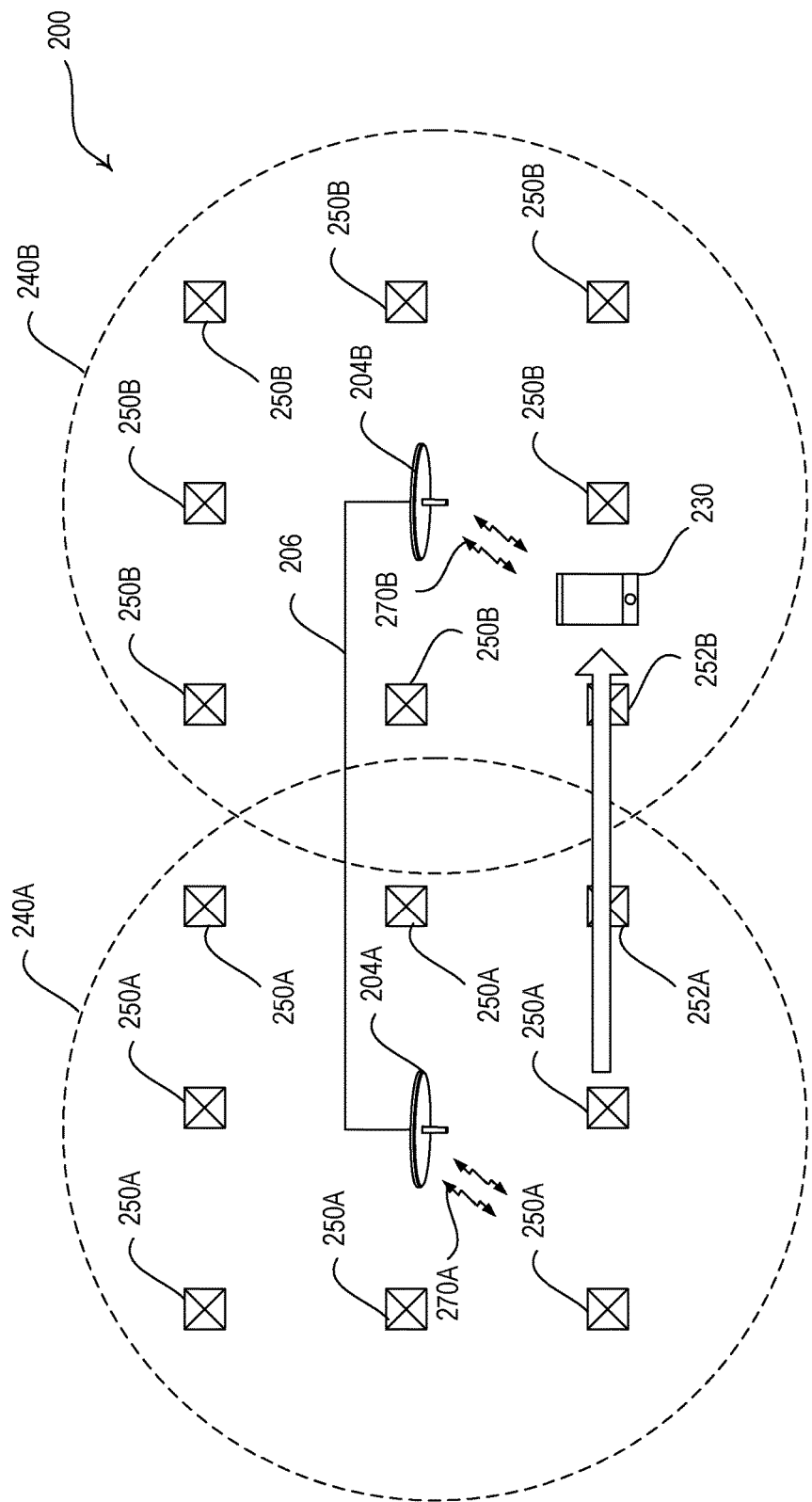
FIG. 2 is a top view of an example load control environment having system controllers and corresponding ranges.

FIG. 2 is a top view of an example load control environment 200 having system controllers 204A, 204B (hereafter collectively referred to as system controllers 204) and corresponding ranges 240A, 240B (hereafter collectively referred to as ranges 240) for configuring (e.g., associating) control devices 250A, 252A, 250B, 252B within a load control system. The system controllers 204A, 204B may be connected via link 206. The link 206 may be a wired link and/or the link may be a wireless link. The link 206 may be a secure link between the system controllers 204A, 204B. The control devices 250A, 252A, 250B, 252B may be control-source devices and/or control-target devices. The system controllers 204 may communicate with one or more network devices 230 via a signal 270A, 270B (hereafter collectively referred to as signal 270). The signal 270 may be a radio frequency (RF) signal, such as BLUETOOTH®; WI-FI®, etc.

The communication from the system controllers 204 to the network device 230 may be limited by a range 240. For example, the system controllers 204A, 204B may be capable of communicating wirelessly with the network device 230 within the respective ranges 240A, 240B. Network device 230 may be positioned beyond the ranges 240A or 240B of the system controller 204A or 204B. When the network device 230 is positioned beyond the ranges 240A or 240B of the system controller 204A or 204B, the network device 230 may be unable to communicate with the system controller 204, and/or the communication quality between the network device 230 and the system controller 204 may be diminished. So that network device 230 may communicate with a system controller 204 over large spaces (e.g., beyond the range of a single system controller), more than one system controller (e.g., system controllers 204A, 204B) may be used within a load control system.

The network device 230 may move from one range to another range. For example, as shown in FIG. 2, the network device 230 may move from range 240A to range 240B. As the network device 230 moves from range 240A to 240B, the network device 230 may disconnect from the wireless network provided by system controller 204A and connect with the wireless network provided by system controller 204B. The network device 230 may seamlessly connect to the wireless networks using the common SSID and/or SSID password for the system controllers 204. To ensure full coverage of a space, and/or to provide redundancy of the load control system, additional system controllers 204 may be provided in a load control system and may be attached to the secure link 206, and provide respective wireless networks using the common SSID and/or SSID password.

The system controllers 204 may communicate with one or more other devices (e.g., control devices 250A, 252A, 250B, 252B) via another signal (e.g., a signal that is different than signal 270). For example, the system controllers 204 may communicate with one or more other devices using a proprietary RF protocol, such as CLEAR CONNECT™. The other signal may have a range that is the same, or different, than range 240. For example, the other signal may have a range that is smaller, or larger, than range 240.

Figure 3B:
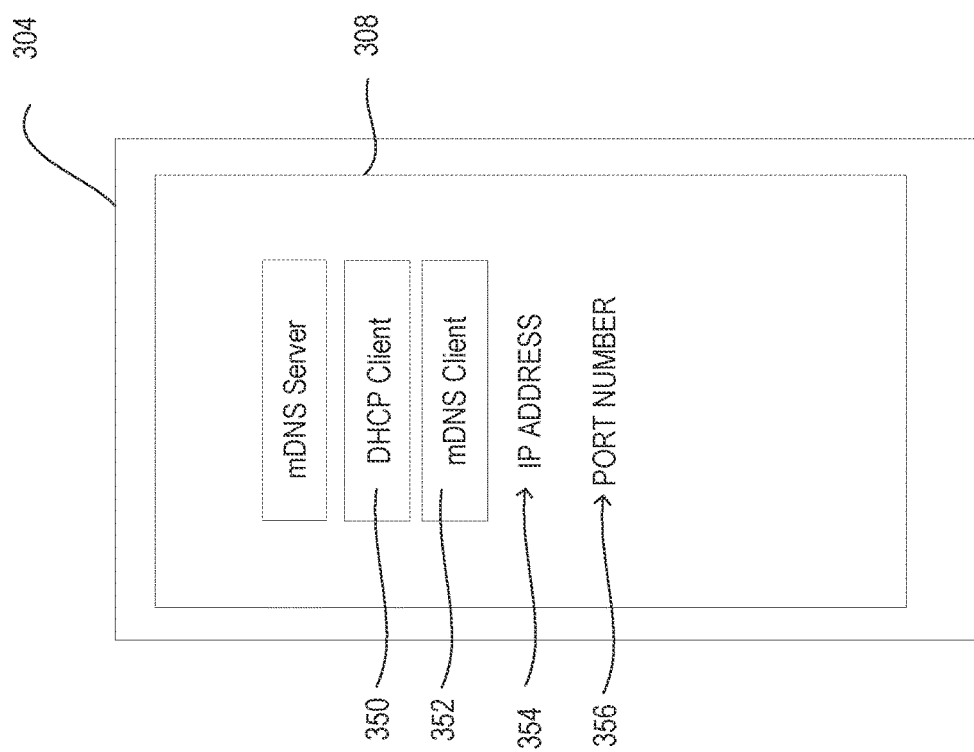

FIGS. 3A-3D are block diagrams depicting an example load control environment 300 having a local area network (LAN). As shown in FIG. 3A, the load control environment 300 may include one or more system controllers 304A, 304B, . . . , 304N (hereafter collectively referred to as system controllers 304). The system controllers 304 may be connected to one another via a network communication link 306. The network communication link 306 may be a wireless link, and/or the network communication link 306 may be a wired link. The network communication link 306 may be a secure link (e.g., the link may provide for secure communications between the system controllers 304A-304N). The network communication link 306 may allow each system controller 304 to communicate (e.g., send digital messages) with another system controller connected to the network communication link 306.

The system controllers 304 may be connected together on the network communication link 306 via a network switch 302. The network switch 302, which may be referred to as switch 302, may be a networking device that connects other devices (e.g., system controllers 304A, 304B, . . . , 304N) together on a computer network. The switch 302 may connect the system controllers 304 together by using packet switching to receive, process, and/or forward data (e.g., digital messages) to one or more destination devices. For example, switch 302 may connect the system controllers 304 together by using packet switching to receive, process, and/or forward data to one or more other system controllers 304. The switch 302 may forward data to the one or more system controllers 304.

The network communication link 306 may be connected to a router 314. The router 314 may connect the system controllers 304 to the Internet 318. The router 314 may link the switch 302 and/or the system controllers 304 to the Internet 318 so that data from the system controllers 304 may be shared with devices connected to the Internet 318 and/or so that the system controllers 304 may receive data from devices connected to the Internet 164. For example, data from the system controllers 304 may be sent to, and/or shared with, a cloud service provided by the Internet 318. Data from the system controllers 304 may be sent to, and/or shared with, external servers for providing access to users beyond the local area network.

System controllers 304 may include one or more types of communication services. For example, each system controller 304 may include a wired communication services 308A, 308B, . . . , 308N (hereafter collectively referred to as wired communication services 308) related to the wired functionality of the system controller 304, wireless communication services 312A, 312B, . . . 312N (hereafter collectively referred to as wireless communication services 312) related to the wireless functionality of the system controller, and/or a grouping of mapping information 310A, 310B, . . . , 310N (hereafter collectively referred to as mapping information 310) enabling the transfer of information received via the wireless communication services 312 to be communicated via the wired communication services 308 and vis versa. For example, the mapping information 310 may include a mapping of wireless IP addresses and/or wireless port numbers to wired IP addresses and/or wired port numbers. The wired communication services 308, wireless communication services 312, and mapping information 310 may be described in greater detail in FIGS. 3B, 3C, and 3D, respectively.

FIG. 3B shows system controller 304 including wired communication services 308. Wired communication services 308 may include one or more services to allow system controller 304 to communicate with a device via a wired communication link. For example, wired communication services 308 may include one or more services to allow system controller 304 to communicate with switch 302 and/or one or more other system controllers. For example, referring to FIG. 3A, the system controller 304A may desire to send a digital message to system controller 304B, via link 306. The system controller 304A may use wired communication services 308A to communicate with system controller 304B, via link 306 and/or system controller 304B may use wired communication services 308B to communicate with system controller 304A.

As shown on FIG. 3B, wired communication services 308 may include Dynamic Host Configuration Protocol (DHCP) client 350, an mDNS client 352, an IP address 354, and/or a wired communication port 356. DHCP may be a standardized network protocol used on IP networks. The DHCP client 350 may be used for dynamically receiving network configuration parameters (e.g., IP addresses) for interfaces and services. For example, the DHCP client 350 included in the wired communication services 308 may allow the system controllers 304 to request (e.g., automatically request) IP addresses 354 and networking parameters from a DHCP server. By automatically requesting IP addresses from a DHCP server, a network administrator or a user of the system controller 304 may be prevented from configuring these settings manually.

Wired communication services 308 may include an IP address 354 with which the system controller 304 may communicate. An IP address may be a numerical label assigned to each device (e.g., switch 302, system controllers 304A, 304B, . . . , 304N) participating in a network, such as a local area network. The IP address 354 may be represented as a collection of bits. For example, the IP address 354 may be represented as a 32-bit number (e.g., for Internet Protocol Version 4 (IPv4)), and/or the IP address 354 may be represented as a 128-bit number (e.g., for (IPv6)). IP addresses may be written and/or displayed in human-readable form (e.g., 192.168.3.1 (IPv4)).

Wired communication services 308 may include a wired communication port 356. The wired communication port 356 may be associated with an IP address of a host and/or may be associated with a protocol type of a digital communication. The wired communication port 356 may complete a destination and/or origination address of a communication. For example, a port number may be identified for each address and protocol by a 16-bit number. Port number 80, for example, is a number that is used for Hypertext Transfer Protocol (HTTP) used in the World Wide Web.

Figure 3D:
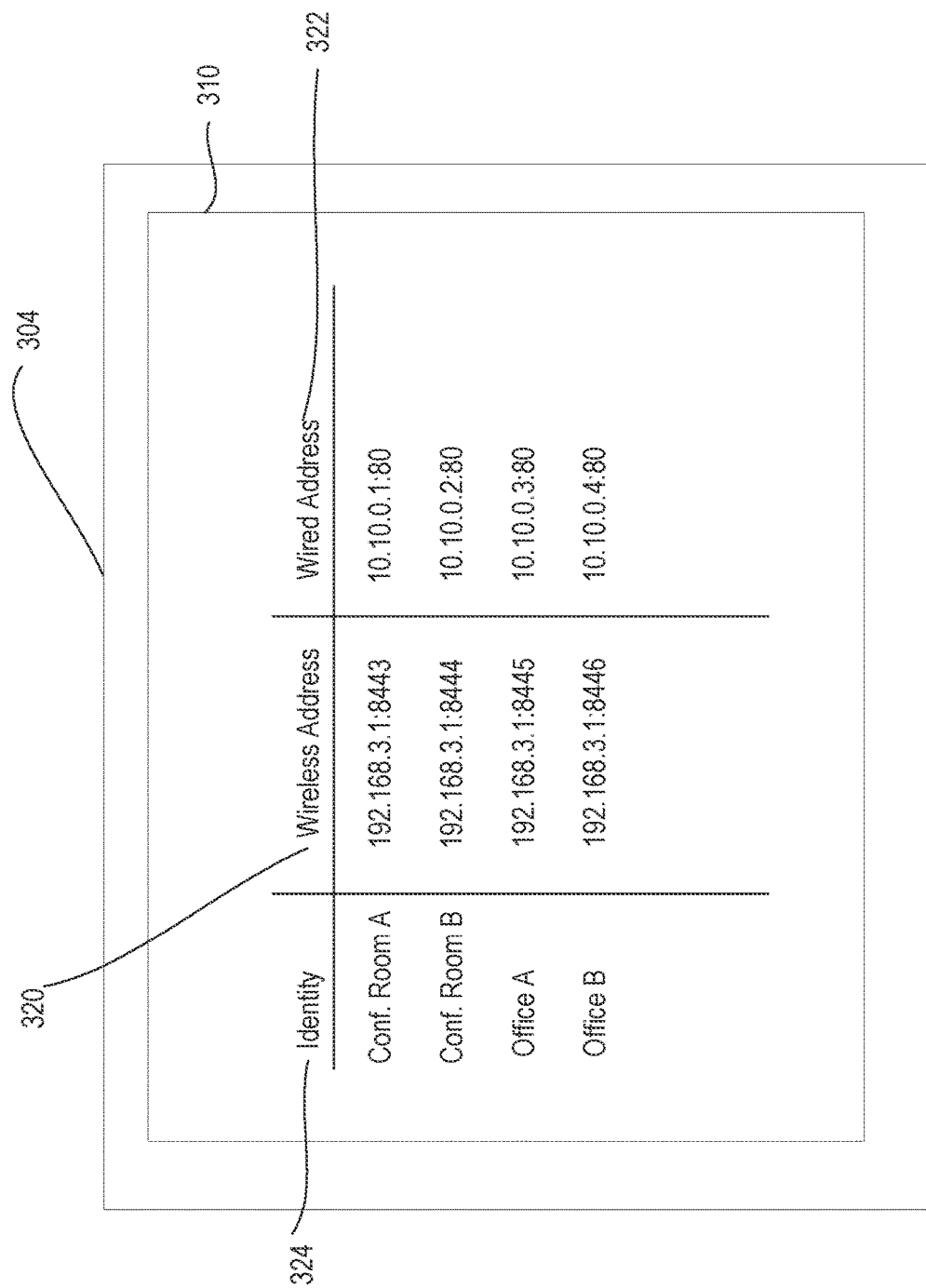

Wired communication services 308 may include multicast Domain Name System (mDNS) client 352. Through mDNS, for example, the system controllers 304 on the LAN may be used to discover other system controllers. For example, the system controllers 304 may each request the same SSID. The mDNS client 352 may generate mapping information 310, which may distinguish each system controller from other system controllers. For example, as shown in FIG. 3D, the mDNS client 352 may generate mapping information 310 that assigns the system controller located in conference room A with wired IP address 10.10.0.1, the system controller located in conference room B with wired IP address 10.10.0.2, the system controller located in Office A with wired IP address 10.10.0.3, and the system located in Office B with wired IP address 10.10.0.4. If a system controller having the same SSID as previously added system controllers is later added to the load control system, the mDNS client 352 may generate mapping information 310 for the added system controller, and mapping information 310 for previously added system controllers may be updated accordingly.

Referring again to FIG. 3B, the system controllers 304 may have similar and/or different information with respect to wired communication services 308. The system controllers 304 may share the same port number (e.g., port number 80) for services. The system controllers 304 may have different wired IP addresses 354. For example, system controllers may have wired IP addresses 10.10.0.1, 10.10.0.2, 10.10.0.3, 10.10.0.4, etc. The system controllers 304 may have the port number 80 for access to HTTP services. The system controllers 304 may include a DHCP client 350 and/or an mDNS client 352.

As shown on FIG. 3C, wireless communication services 312 may include DHCP server 360, mDNS server 362, web server 364, IP address 366, wireless communication port 368, Server Set Identifier (SSID) 370, and/or SSID password 372. The DHCP server 360 may be used for dynamically distributing network configuration parameters (e.g., IP addresses) for interfaces and services. For example, the DHCP server 360 included in the wireless communication services 312 may allow the system controllers 304 to send (e.g., automatically send) IP addresses and networking parameters from the system controllers 304 to client devices (e.g., load control devices, network devices, etc.). By automatically sending IP addresses to the load control devices and/or network devices, a network administrator or a user of the load control devices and/or network device may be prevented from configuring these settings manually.

The web server 364 may process requests via HTTP protocol. The web server 364 may receive HTTP requests and deliver web pages to the requesting clients.

The SSID 370 may be a name associated with a wireless LAN within a load control system. For example, a network device may use one or more SSIDs to identify system controllers 304 within the load control system. The network device may use one or more SSIDs to join system controllers 304 within the load control system. The SSID 370 may be case-sensitive text strings. For example, the SSID 370 may be a sequence of alphanumeric characters (e.g., letters and/or numbers) with a length of 32 characters or less. Wireless communication services 312 may include SSID password 372. The SSID password 372 may be used in conjunction with the SSID 370 to log in to applications using the SSID 370. The SSID 370 and/or the SSID password 372 may be common to the system controllers 304 and may be shared on the secure link 306.

The system controllers 304 may have similar information with respect to wireless communication services 312. The system controllers 304, for example, may have the same IP address 366 with respect to wireless communication services 312. For example, referring again to FIG. 3A, system controllers 304A, 304B, . . . , 304N may have the IP address 192.168.3.1. As shown in FIG. 3C, the system controllers 304 may include the DHCP server 360 and/or mDNS server 362. The system controllers 304 may have different information with respect to wireless communication services 312. The system controllers 304 may have different port numbers 368. For example, referring again to FIG. 3A, system controller 304A may have port number 8444 and system controller 304B may have port number 8445 for routing information.

As shown in FIG. 3D, mapping information 310 may include information for mapping wired communication addresses from devices (e.g., system controllers 304, switches 302, and/or routers 314) with wireless communication addresses from devices (e.g., control devices and/or network devices). Mapping information 310 may include an identification column 324 for identifying system controllers that have been mapped. For example, mapping information 310 may include a column 324 that identifies system controllers by location (e.g., system controller located in Conference Room B), by distance from network device, etc.

Mapping information 310 may include a wired address column 322 that includes a list of wired addresses for wired devices. Wired address column 322 may include wired IP address of the devices, such as IP addresses 10.10.0.1, 10.10.0.2, 10.10.0.3, 10.10.0.4, etc. The wired addresses 322 may each correspond to a system controller on the secure link. The wired addresses 322 may include a port number of the services to be accessed at the device, such as port number 80. The port number of the device may be provided in addition to the wired IP address of the device. The port number may be appended to the wired IP address. For example, the wired IP address of the device may be 10.10.0.1.80, which may include the IP address 10.10.0.1 of the device, along with the device's port number 80.

Mapping information 310 may include a wireless address column 320 that provides a list of wireless devices addresses. Wireless addresses 322 may include a wireless IP address of the devices, such as 192.168.3.1. The wireless IP addresses included in the wireless address column 320 may be the same. Wireless address column 320 may include a wireless port number of the device, such as port number 8444. Each of the port numbers included in the wireless address column 320 may be different. The port number of the device may be provided in addition to, or, in the alternative of, the wireless IP address of the device. The port number may be appended to the IP address. For example, the wireless IP address may be 192.168.3.8444, which may include the wireless IP address 192.168.3 of the device, along with the device's port number 8444.

Mapping information 310 may provide a correlation between devices provided in wireless address column 320 and devices provided in wired address column 322. The devices within a row of the mapping information may be correlated (e.g., mapped) to one another, via respective addresses (e.g., IP addresses and/or port numbers). For example, each row of the mapping information 310 may include wireless device information that correlates with wired device information. As an example, shown on FIG. 3D, Office A may have a wireless IP address 192.168.3.1 and port number 8445 that maps with a wired IP address of 10.10.0.3 and port number 80 of the office. Thus, a network device that communicates with the system controller located in Office A will use IP address 192.168.3.1 and port number 8445 for wireless communication, and a system controller that communicates with the system controller located in Office A will use IP address of 10.10.0.3 and port number 80 for wired communication.

The system controllers 304 may have the mapping information 310 stored thereon for performing port forwarding of digital communications received from network devices. The mapping information 310 may be used by the system controllers 304 to seamlessly provide configuration of a system controller while the network device is switching between different wireless networks. The system controllers 304 may seamlessly forward wireless communications from a network device to another system controller via wired communications, or to the system controller itself, for processing. Similarly, the system controller 304 may also forward communications from the another system controller received via wired communications to the network device via wireless communications.

Referring again to FIG. 3A, a user of the load control system may have a network device 330 for communicating with system controllers 304 to configure the load control system. The network device 330 may communicate with a system controller 304 by establishing a wireless connection to the system controller 304. The system controller 304 with which the network device 330 wirelessly communicates may be known as a gateway system controller. The system controller 304 with which the network device 330 does not wirelessly communicate may be known as a remote system controller. A system controller that communicates with a network device via a gateway system controller may be referred to as a target system controller. A target system controller may be a gateway system controller and/or a target system controller may be a remote system controller. The user may send (e.g., wirelessly send) digital messages to the gateway system controller for being processed.

The network device 330 may communicate with the system controllers 304 based on predefined information. For example, the network device 330 may seamlessly communicate with the system controllers 304 having a predefined SSID and/or predefined SSID password. The system controllers 304 in the load control system may have a common SSID and/or SSID password. For example, system controller 304A may have the common SSID and/or SSID password as system controller 304B, and system controller 304A may have the common SSID and/or SSID password as other system controllers on the secure link 306.

Each system controller 304 may broadcast a signal (e.g., beacon frames). The signal broadcasted from each system controller 304 may include the SSID of the broadcasting system controller 304. The network device 330 may discover one or more system controllers 304 by passively listening for the signal broadcasts. Also, or alternatively, the network device 330 may transmit signals (e.g., probe frames) that may be used to actively search for a system controllers 330 with a desired SSID. Once the network device 330 locates a system controller 304 with a desired SSID, the network device 330 may send an associate signal (e.g., request frame) that may include the desired SSID. The system controller 304 may reply with an associate signal (e.g., response frame), which may include the desired SSID.

The system controllers 304 within a load control system may have a common (e.g., a same) SSID. More than one system controller having the common SSID may allow the network device 330 to connect from one system controller 304 to another. System controllers 304 having the same SSID may allow the network device 330 to seamlessly connect from one system controller to another system controller without the user of the network device 330 noticing transferring connections from one system controller to other system controllers. For example, the user of the network device 330 may be connected to system controller 304A. The network device 330 may be connected to system controller 304A due to the received signal strength from the system controller 304A being greater than one or more other signal strengths received by network device 330 (e.g., being greater than one or more other signal strengths received by network device 330 that were transmitted from other system controllers). If the network device 330 moves towards system controller 304B, for example, and away from system controller 304A, at some point the strength of signal received by network device 330 may be greater from system controller 304B. Upon the signal strength received by the network device 330 being greater from system controller 304B, the network device 330 may disconnect from the wireless network of system controller 304A and may connect to the wireless network of system controller 304B. The disconnection from system controller 304A and connection to system controller 304B may be unnoticed by (e.g., seamless to) the user. The disconnection from the network of system controller 304A and connection to the network of system controller 304B may be unnoticed to the user because system controller 304A and system controller 304B may share a common SSID and/or SSID password.

The system controller 304 to which the network device 330 is wirelessly connected may be referred to as the gateway system controller. System controllers 304 that are being accessed through a port forwarding technique may be referred to as target system controllers. A system controller 304 may be a gateway system controller and a target system controller, as the network device 330 may be wirelessly connected to a system controller with which it is accessing for configuration of the load control system. A port forwarding technique may be used to access the same system controller 304 to which the network device 330 is connected.

When the network device 330 connects with a gateway system controller 304A, the network device 330 may access the web server of the gateway system controller 304A through a local forwarding technique. The network device 330 may make an HTTP request to the gateway system controller 304A. For example, the network device 330 may make an HTTP request to the web server in the wireless communication services 312A of the gateway system controller 304A. The web server of the gateway system controller 304A may respond to the network device 330 with an HTTP response. The HTTP response to the network device 330 may include a webpage that lists one or more system controllers that may be configured by the network device 330 (e.g., one or more gateway system controllers). For example, the HTTP response to the network device 330 may include a listing of system controllers 304A, 304B, . . . 304N that may be configured by the network device 330. The HTTP response may include the system controllers that may be configured, as well as information related to the system controllers. For example, the HTTP response may include the wireless IP address of the system controllers, the port numbers of the system controllers, the locations of the system controllers, etc.

The user may select, on the network device 330, the system controller to be configured (e.g., the target system controller). The network device 330 may display a listing of system controllers to be configured in a list, a table, etc. For example, the network device 330 may display one or more links on the network device 330 that correspond to the system controllers 304A, 304B, . . . 304N that may be configured by network device 330. The user may select a link on the network device 330 to indicate that the user desires to configure the selected system controller 304B, which may be a target system controller. Upon the system controller 304B being selected on the network device 330 (e.g., selected via a link displayed on the network device 330), the wireless IP address and/or the port number of the selected system controller 304B may be sent to the web server of the gateway system controller 304A. The gateway system controller 304A may determine the wired IP address and/or port number corresponding to the selected system controller 304B. For example, the gateway system controller 304A may determine the wired IP address and/or port number corresponding to the selected system controller 304B via mapping information 310A. The gateway system controller 304A may determine the wired IP address and/or port number corresponding to the selected system controller 304B by determining the address for accessing the system controller 304B via the wired communication services 308B from the mapping information 310A.

When network device 330 sends (e.g., wirelessly sends) digital messages to the gateway system controller 304A, gateway system controller 304A may identify the wireless IP address and port number as corresponding to the target system controller 304B and send (e.g., forward) the digital message to the target system controller 304B via the secure link 306. For example, the gateway system controller 304A may send (e.g., forward) the digital message to the target system controller 304B via the wired IP address and/or port number determined from the mapping information 310A. The network device 330 may send a digital signal to the gateway system controller 304A, and the gateway system controller 304A may send (e.g., forward) the digital message to the target system controller 304B for enabling the network device 330 to perform configuration on the target system controller 304B. The gateway system controller 304A may send (e.g., forward) the digital message to the target system controller 304B via an HTTP request. The target system controller may respond to the HTTP request with an HTTP response. The HTTP request and/or HTTP response may be sent between the gateway system controller 304A and target system controller 304B via wired communication services 308B. Upon receiving the HTTP response, via the wired communication services 308A, the gateway system controller 304A may send the digital messages to the network device 330 via the wireless communication services 312A. The network device 330 may display a webpage generated at the web server of the target system controller 304B via the wireless communication services 312B.

As provided herein, the load control system may be configured so that the network device 330 may be wirelessly connected to a gateway system controller 304A and communicate (e.g., send digital messages) with a target system controller 304B for configuring the load control system. The network device 330 may continue to communicate with target system controller 304B, independent of which system controller 304 the network device 330 is wirelessly connected. For example, network device may disconnect from the gateway system controller 304A and establish a connection to the wireless network of system controller 304N, which may be established as the gateway system controller. The gateway system controller 304N may send digital messages (via forwarding by system controller 304N) to system controller 304B. The system controller 304N may have the same SSID as system controller 304A. Upon the network device 330 sending digital messages to system controller 304N, system controller 304N may send (e.g., forward) the digital messages to system controller 304B via the secure link 306. System controller 304N may send (e.g., forward) the digital messages to system controller 304B using the same mapping information 310, SSID, and/or SSID password that the network device 330 used when wirelessly communicating with system control 304A.

Figure 4A:
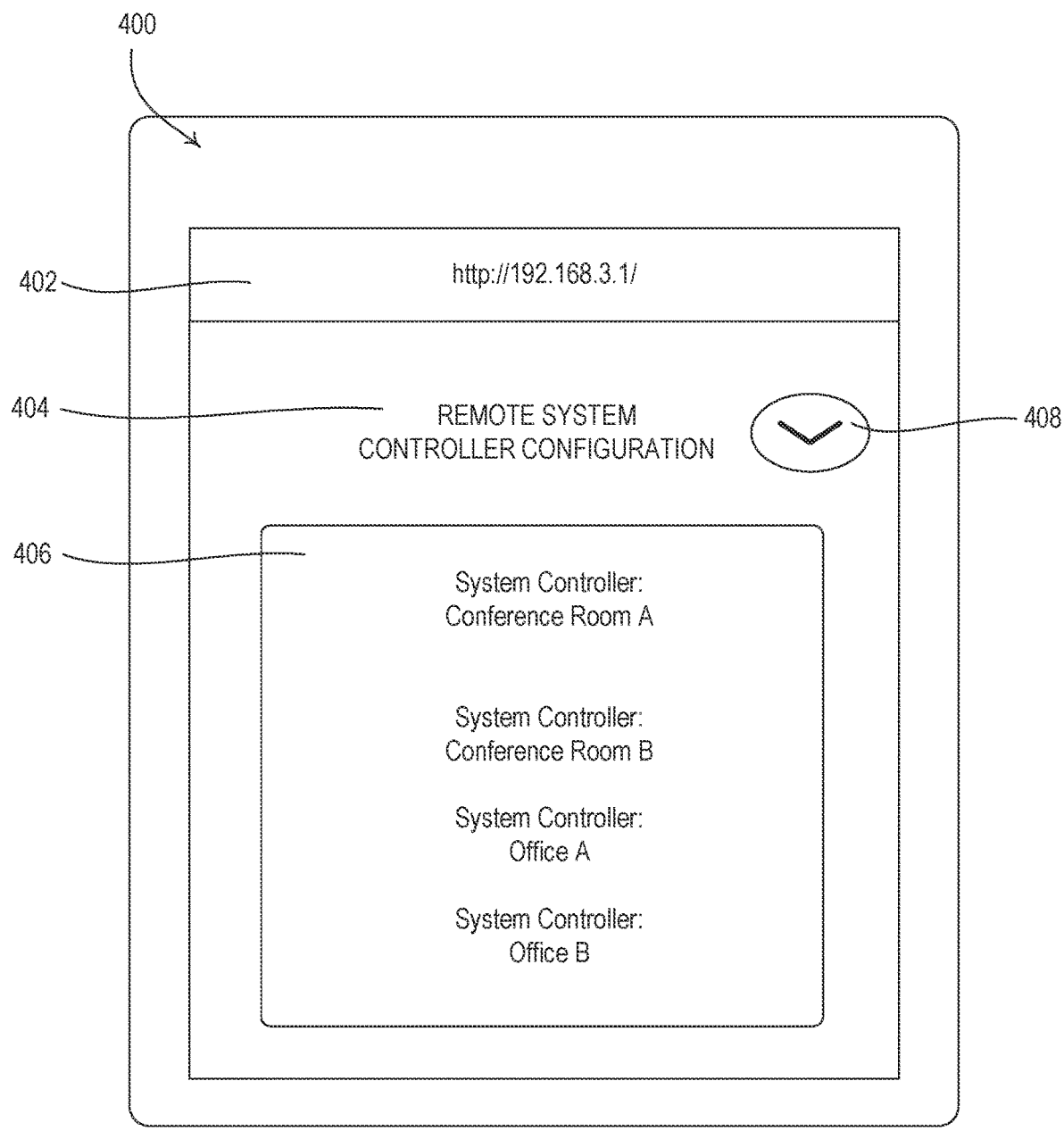
FIGS. 4A-4B are example GUIs that may be implemented for configuring and communicating with system controllers.
Figure 4B:
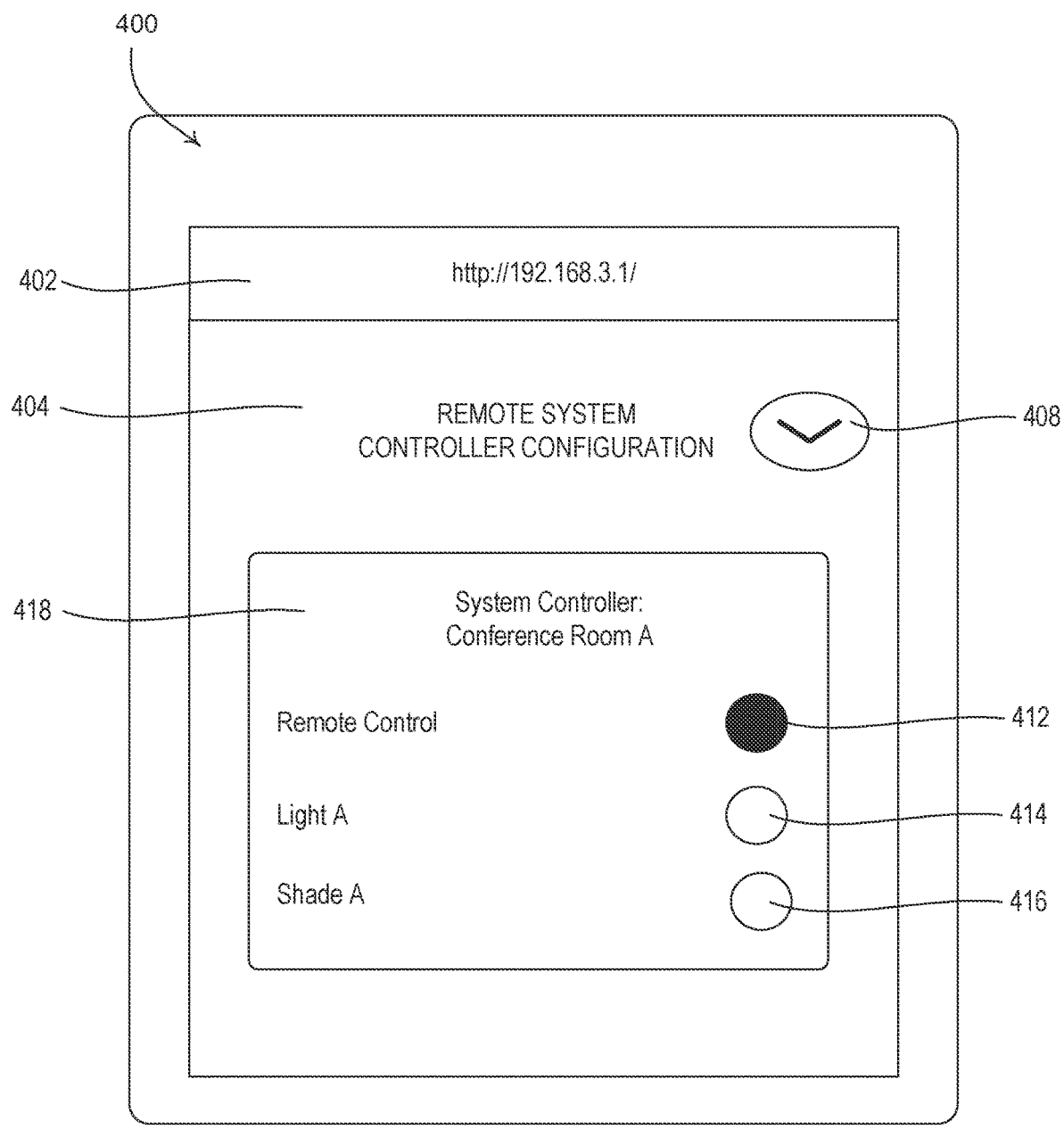

FIGS. 4A-4B show example graphical user interfaces (GUIs) 400 provided on a network device. FIG. 4A shows an example GUI 400 for communicating with a system controller. For example, FIG. 4A shows an example GUI 400 that wirelessly communicates with a gateway system controller. The GUI 400 may be used for selecting a target system controller. The target system controller may be a gateway system controller and/or a remote system controller. For example, the network device may communicate with a gateway system controller that may be a target system controller.

The GUI 400 may display an IP address 402. The IP address 402 may be provided by the gateway system controller. The IP address 402 provided on the GUI may be the same, independent of which gateway system controller the network device communicates with within the load control system. For example, the IP address 402 may be the same whether the network device is communicating with system controller 304A or 304B. As the network device disconnects from one system controller (e.g., 304A) to another system controller (e.g., 304B), the IP address 402 provided on the GUI may not change.

GUI 400 may include a selection panel 404, for selecting the activity that the user may desire to perform. For example, as provide by FIG. 4A, the GUI may indicate to the user, via selection panel 404, that the network device is configured to select a target system controller for configuration. The GUI may include a drop-down button 408, for selecting different selection panels.

If a user desires to select target system controllers, the user may select the options indicated on FIG. 4A. For example, if a user desires to select a target system controller, a list of potential target system controllers may be provided on list portion 406. List portion may provide a list of one or more system controllers that may be selected as target system controllers. Thus, the system controllers indicated on list portion 406 may receive digital communications from network device, independent of whether the network device is, and/or will be, wirelessly connected with the system controller. The system controllers provided on the list portion 406 may be provided on the network device by category, by location, by human readable name, by IP address, by port number, etc.

Upon the user selecting a system controller on list portion 406 of the network device, the GUI on network device may provide another screen to the user. Such a screen may be provided as system controller screen 418 on FIG. 4B. For example, FIG. 4B shows an example GUI wherein the user has selected, as the target system controller, the system controller within Conference Room A. The system controller screen 418 may include the name of the system controller that has been selected as target system controller. The system controller screen 418 may include additional information relating to the selected system controller, including the load control devices that have, and have not, been associated with the selected system controller. The GUI may indicate whether load control devices have been associated via many and various indications. For example, a shaded portion next to a load control device may indicate that the load control device has been associated with the selected system controller and/or an unshaded portion next to a load control device may indicate that the load control device has not been associated with the selected system controller. Using this example, button 412 on FIG. 4B shows that the system controller located in Conference Room A has been associated with a remote control, and buttons 414 and 416 indicate that the system controller has not been associated with Light A and Shade A, respectively.

Figure 5:
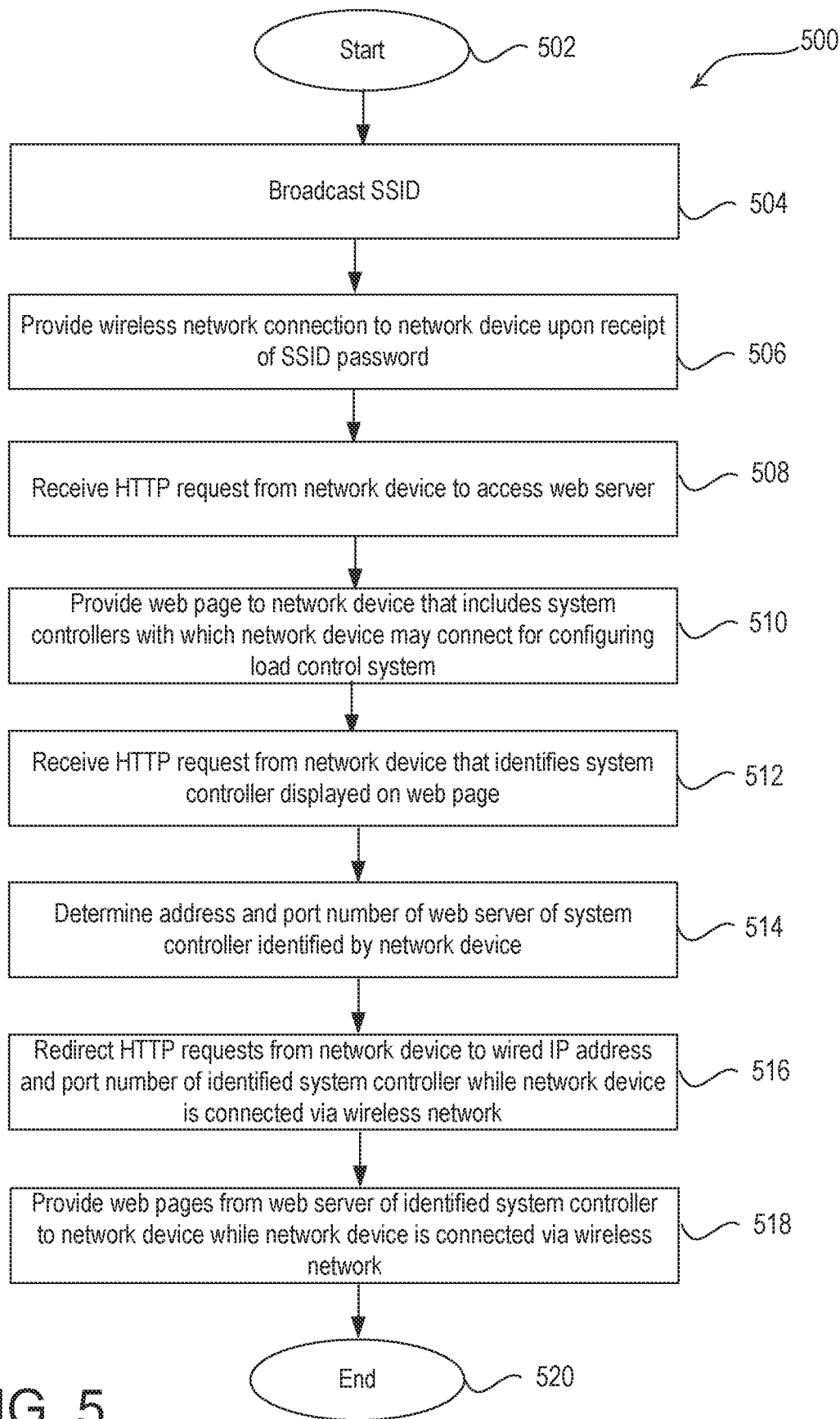
FIG. 5 is a flow diagram of an example method of a system controller redirecting communication from a network device to another system controller.

FIG. 5 is a simplified flow diagram of an example method of a system controller redirecting communication from a network device to another system controller. At 502, the method may begin. The system controller, at 504, may broadcast an SSID. The system controller may be a gateway system controller. For example, the system controller may be a gateway system controller that communicates with one or more target system controllers. The system controller may be a gateway system controller that is a target system controller. The gateway system controller may receive an SSID password that corresponds to the SSID. The gateway system controller, at 506, may provide a connection (e.g., a wireless network connection) to network device upon receipt of SSID password. At 508, the gateway system controller may receive an HTTP request from network device. For example, the gateway system controller may receive an HTTP request from network device to access the web server of the gateway system controller. The gateway system controller may, at 510, provide a web page to the network device. The web page may include one or more system controllers (e.g., target system controllers) with which network device may connect for configuring load control system. At 512, the gateway system controller may receive an HTTP request from the network device. The HTTP request may identify the target system controller displayed on the web page.

The gateway system controller may, at 514, determine the wired IP address and port number of the target system controller (e.g., the web server of the target system controller) identified by the network device. The gateway system controller may determine the wired IP address and port number of the target system controller using mapping information (such as mapping information 310 shown on FIG. 3D). At 516, the gateway system controller may redirect HTTP requests from the network device to the wired IP address and port number of the target system controller. The gateway system controller may redirect HTTP requests from the network device to the wired IP address and port number of the target system controller while the network device is connected to the gateway system controller via a wireless network. The gateway system controller, at 518, may provide web pages from a web server of the target system controller to the network device while network device is connected to the gateway system controller via a wireless network.

Figure 6:
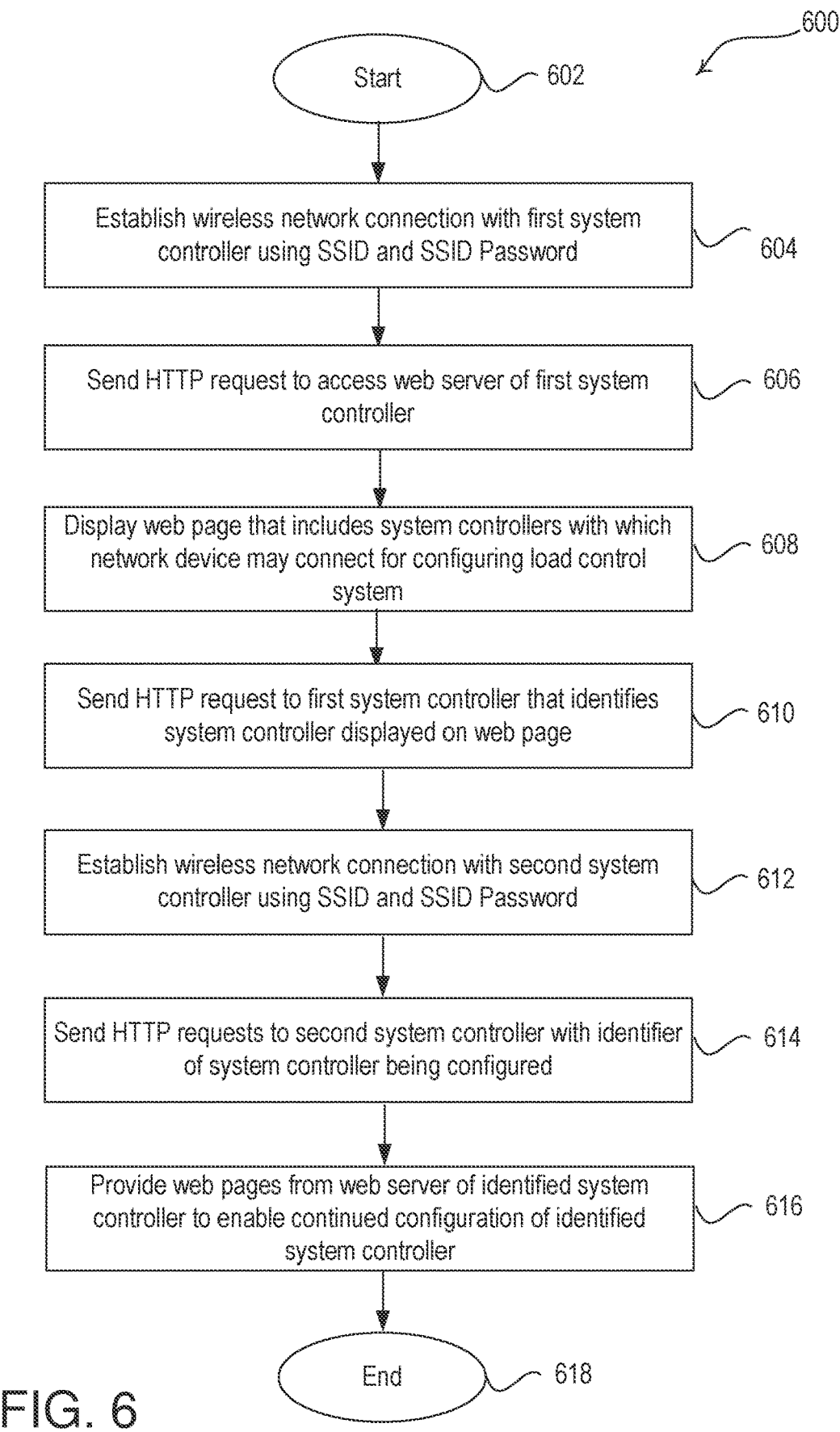
FIG. 6 is a flow diagram of an example method of a network device communicating with system controllers.

FIG. 6 is a simplified flow diagram of an example method of a network device communicating with one or more system controllers. The method may begin at 602. The network device may, at 604, establish a wireless network connection with a first system controller. The network device may establish a wireless network connection with the first system controller using an SSID and/or a corresponding SSID Password. At 606, the network device may send an HTTP request to access a web server of the first system controller. For example, the network device may send an HTTP request to a port (e.g., port 80) of the first system controller. The network device may, at 608, display a web page. The web page may include system controllers with which the network device may connect for configuring the load control system. At 610, the network device may send an HTTP request to the first system controller. The HTTP request may identify the first system controller as a system controller (e.g., a target system controller) displayed on the web page at the network device. The network device may display a page for configuring one or more target system controllers, for example, for configuring the first system controller.

At 612, the network device may establish a wireless network connection with a second system controller. The network device may establish a wireless network connection with the second system controller using an SSID and/or corresponding SSID Password. The network device may establish a wireless network connection with a second system controller due to the second system controller having a stronger signal than the first system controller. The SSID and SSID password used for the second system controller may be the same SSID and SSID password as used by the first system controller. The network device may, at 614, send HTTP requests to the second system controller. At 616, the network device may be provided with web pages from a web server of the first system controller. The web pages may be used to enable continued configuration of the target system controller using the network device having a wireless connection with the second system controller.

Figure 7:
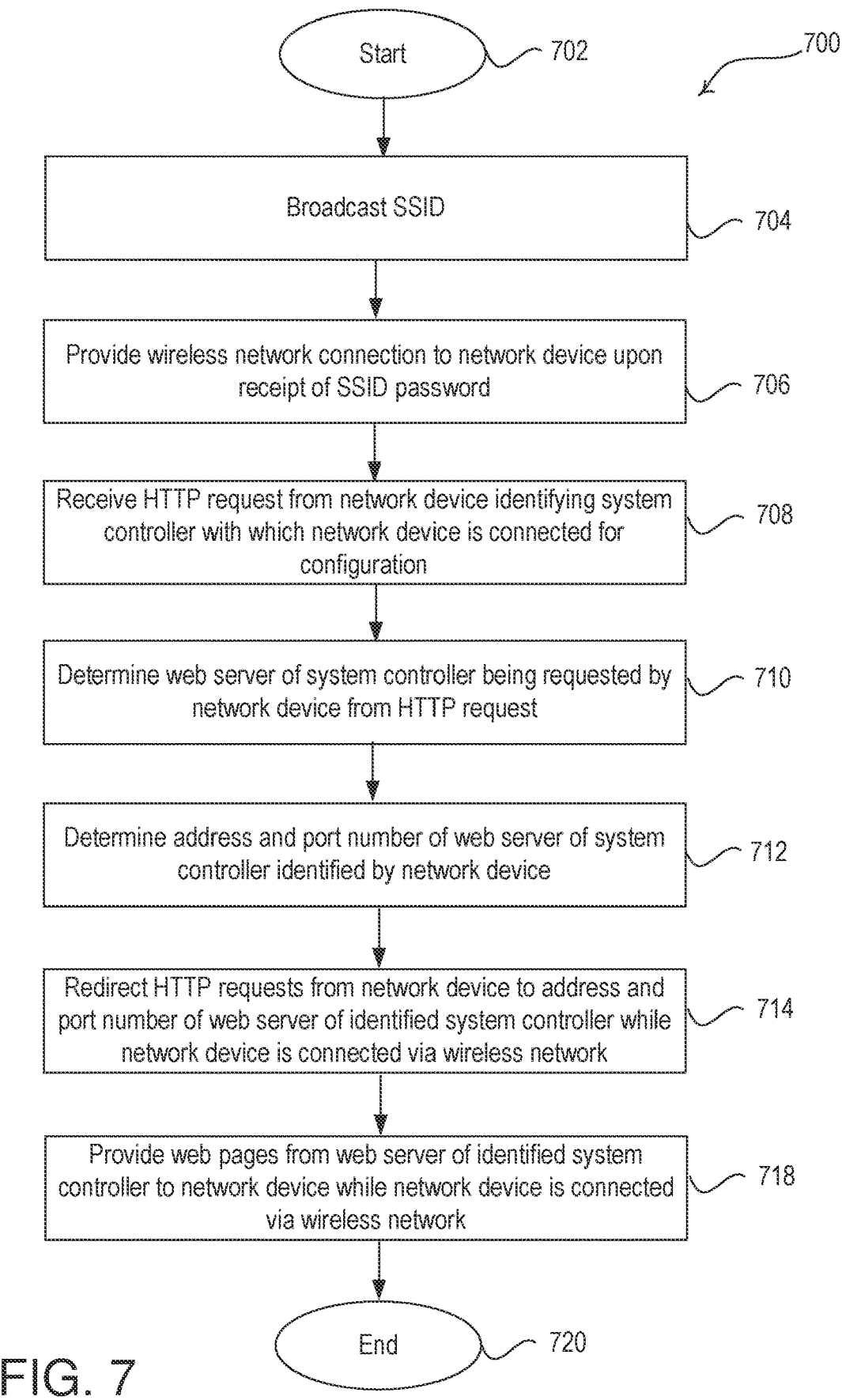
FIG. 7 is a flow diagram of an example method for a system controller redirecting digital messages from a network device to another system controller.

FIG. 7 is a simplified flow diagram of an example method for a system controller redirecting digital messages from a network device to another system controller. The method may begin at 702. At 704, a system controller (e.g., a gateway system controller) may broadcast an SSID. The system controller may be a gateway system controller that communicates with one or more target system controllers. The system controller may be a gateway system controller that is a target system controller. The gateway system controller, at 706, may provide a wireless network connection to a network device. The gateway system controller may provide a wireless network connection to a network device upon receipt of a SSID password. At 708, the gateway system controller may receive an HTTP request from the network device. The HTTP request may identify the system controller (e.g., target system controller) with which the user of the network device desires to communicate.

The gateway system controller may, at 710, determine the web server of the target system controller being requested by the network device (e.g., the target system controller being requested in the HTTP request). At 712, the gateway system controller may determine the address and port number of the web server of the target system controller identified by network device. The gateway system controller may determine the address and port number of the web server of the target system controller using mapping information (such as mapping information 310 shown on FIG. 3D). At 714, the gateway system controller (e.g., the gateway system controller) may redirect HTTP requests from network device to the address and port number of web server of the target system controller. The gateway system controller may redirect HTTP requests from the network device to the address and port number of web server of the target system controller while the system controller (e.g., the gateway system controller) is connected to network device via a wireless network. The gateway system controller, at 718, may provide web pages from the web server of the target system controller to the network device. The gateway system controller, at 718, may provide web pages from the web server of the target system controller to the network device while the gateway system controller is connected to the network device via a wireless network.

Figure 8:
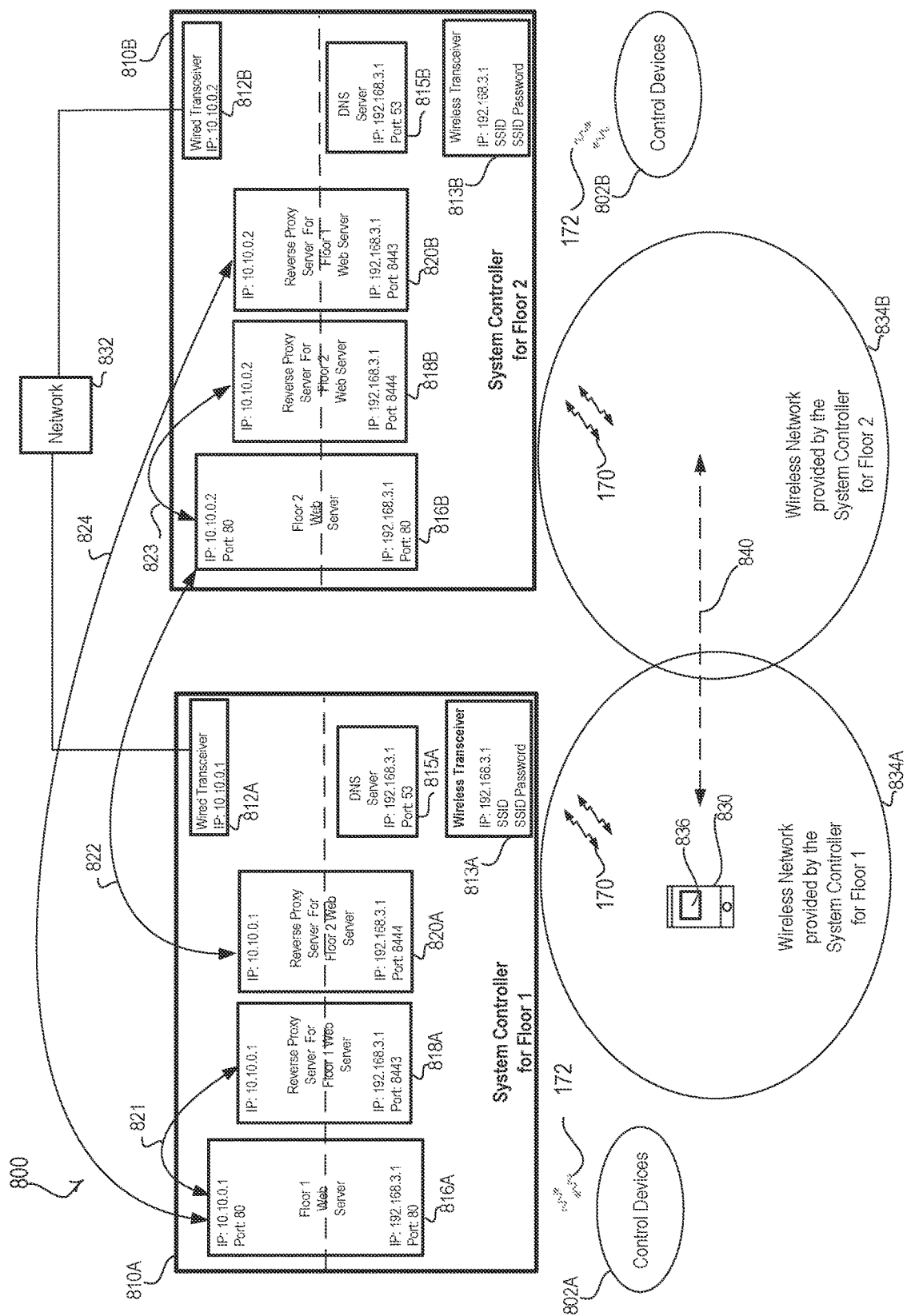
FIG. 8 is another system diagram of example system controllers of a load control system.

Referring now to FIG. 8, there is shown an example load control environment 800 that includes another example load control system. As an example, load control environment 800 may be a building with multiple floors. Load control environment 800 is shown as including two system controllers 810A and 810B, although the load control environment may include additional system controllers. System controller 810A may be associated with a first floor (e.g., floor 1) of the load control environment. A set of control devices (e.g., control-source devices and/or control-target devices) 802A may be located on the first floor and may be in wireless communication range of system controller 810A. A user via a network device 830 may desire to access system controller 810A to configure control devices 802A and system controller 810A as described herein. Similarly, system controller 810B may be associated with a second floor of the load control environment. A different set of control devices (e.g., control-source devices and/or control-target devices) 802B may be located on the second floor (e.g., floor 2) and may be in wireless communication range of system controller 810B. The user via network device 830 may also desire to access system controller 810B to configure control devices 802B and system controller 810B.

Each system controller 810A, 810B may include a transceiver 812A, 812B configured to communicate with a wired based network 832 (although and/or additionally, a wireless transceiver may also be used if network 832 is a wireless based network). Each system controller 810A and 810B may be assigned a respective and different IP address on network 832 (in this example, system controller 810A is assigned IP address 10.1.1.1 and system controller 810B is assigned IP address 10.1.1.2). The system controllers may communicate with one another via network 832 and in particular, may be configured to communicate via network 832 in a secure fashion.

Each system controller 810A, 810B may also include a transceiver 813A, 813B. Through its respective transceiver 813A, 813B, each system controller 810A, 810B may provide a respective wireless network 834A, 834B (which are shown illustratively in FIG. 8 as ovals). The wireless network 834A provided by system controller 810A may be separate and independent from the wireless network 834B provided by system controller 810B. Each wireless network provided by the two system controllers may have an SSID and possibly an SSID password. As discussed herein, the SSID and SSID password assigned to each network 834A, 834B may be the same values. In other words, a transceiver 813A, 813B may be configured with same SSID values and the same SSID password values. Network device 830 may establish a wireless connection with each system controller over the controller's respective wireless network 834A, 834b. To do this, the network device may be configured with the SSID/SSID password of the networks and as discussed herein, may automatically connect/disconnect (without intervention by a user) to/from either wireless network provided by the respective system controllers based on network signal strengths being received by the network device from the respective system controllers. The range of each wireless network 834A and 834B may be limited such that the network device may be able to only connect directly to system controller 810A when on floor 1 and may be able to only connect directly to system controller 810B when on floor 2. Each system controller may be assigned an IP address on its respective wireless network 834A,834B and in particular, may be assigned the same IP address (for example, 192.168.3.1). Network device 830 may also be assigned an IP address on the respective networks (for example, 192.168.3.2). The IP address that the network device has on each network 834A, 834B may be the same address regardless of which network it is connected to.

Although not shown, each system controller 810A and 810B may also include a wireless transceiver to communicate with respective control devices 802A, 802B via wireless signals 172.

Each system controller 810A and 810B may also include an HTTP based web server 816A, 816B. Each web server may be accessed by the network device 830 from the respective wireless networks 834B, 834B. In other words, web server 816A may be accessed by the network device 830 from network 834A at the wireless IP address assigned to system controller 810A on wireless network 834A (here, 192.168.3.1) and at a well-defined port number, such as port number 80. Similarly, web server 816B may be accessed by the network device 830 from network 834B at the wireless IP address assigned to system controller 810B on wireless network 834B (here, 192.168.3.1) and at a well-defined port number, such as port number 80. Each web server 816A, 816B may also be accessed from the wired network 832. In other words, web server 816A may be accessed from network 832 at the wired IP address assigned to system controller 810A on network 832 (here, 10.10.0.1) and at a well-defined port number, such as port number 80. Similarly, web server 816B may be accessed from network 832 at the wired IP address assigned to system controller 810B on network 832 (here, 10.10.0.2) and at a well-defined port number, such as port number 80. As discussed herein, a user via network device 830 may use a web browser 836, for example, to access web server 816A of system controller 810A and through interactions with the web browser configure (e.g., associate) control devices 802A and/or system controller 810A. Similarly, the user via network device 830 may use web browser 836 to access web server 816B of system controller 810B and through interactions with the web browser configure (e.g., associate) control devices 802B and/or system controller 810B.

Each system controller 810A, 810B may also include two reverse proxy servers 818A/818B and 820A/820B, one for its respective web server 816A, 816B and one for the other system controller's web server 816A, 816B. For example, system controller 810A may include a reverse proxy server 818A for its web server 816A. As an example, using mapping information (e.g., similar to mapping information 310), the system controller 810A may configure reverse proxy server 818A to have an IP address and port number on its wireless network 834A (for example, 192.168.3.1:8443). The system controller 810A may further use mapping information to configure reverse proxy server 818A to interface with web server 816A via the wired network (i.e., at IP/port pair 10.10.0.1:80), as shown by connection 821. In other words, a user that is connected to system controller 810A via network 834A may access/interface with web server 816A directly via IP/port pair 192.168.3.1:80 or indirectly via reverse proxy server 818A by accessing the reverse proxy server at IP/port pair 192.168.3.1:8443. System controller 810A may also include a reverse proxy server 820A for web server 816B of system controller 810B. Using mapping information for example, the system controller 810A may configure reverse proxy server 820A to have an IP address and port number on wireless network 834A (for example, 192.168.3.1:8444). The system controller 810A may further use mapping information to configure reverse proxy server 820A to interface with web server 816B via the wired network (i.e., at IP/port pair 10.10.0.2:80), as shown by connection 822. Hence, a user that is connected to system controller 810A via network 834A may access/interface with web server 816B of system controller 810B indirectly via reverse proxy server 820A by accessing the reverse proxy server at IP/port pair 192.168.3.1:8444.

Similarly, system controller 810B may include a reverse proxy server 818B for its web server 816B. Using mapping information for example, the system controller 810B may configure reverse proxy server 818B to have an IP address and port number on its wireless network 834B (for example, 192.168.3.1:8444). The system controller 810B may further use mapping information to configure reverse proxy server 818B to interface with web server 816B via the wired network (i.e., at IP/port pair 10.10.0.2:80), as shown by connection 823. In other words, a user that is connected to system controller 810B via network 834B may access/interface with web server 816B directly via IP/port pair 192.168.3.1:80 or indirectly via reverse proxy server 818B by accessing the reverse proxy server at IP/port pair 192.168.3.1:8444. System controller 810B may also include a reverse proxy server 820B for web server 816A of system controller 810A. Using mapping information for example, the system controller 810B may configure reverse proxy server 820B to have an IP address and port number on wireless network 834B (for example, 192.168.3.1:8443). The system controller 810B may further use mapping information to configure reverse proxy server 820B to interface with web server 816A via the wired network (i.e., at IP/port pair 10.10.0.1:80), as shown by connection 824. Hence, a user that is connected to system controller 810B via network 834B may access/interface with web server 816A of system controller 810A indirectly via reverse proxy server 820B by accessing the reverse proxy server at IP/port pair 192.168.3.1:8443.

Note that the reverse proxy servers 818A and 820B for the web server 816A of system controller 810A both have the same IP/port pair (here, 192.168.3.1:8443). Similarly, note that the reverse proxy servers 820A and 818B for the web server 816B of system controller 1210B both have the same IP/port pair (here, 192.168.3.1:8444). In other words, regardless of the wireless network 834A, 834B the network device 830 is connected to, the network device may access a given web server 816A, 816B by using the same IP/port pair via a respective reverse proxy server.

One will recognize that if example load control environment 800 included additional system controllers beyond the two shown in FIG. 8, each of the system controllers 810A, 810B may also include a reverse proxy server for each additional system controller.

Reference will now be made to example operations of the load control system of FIG. 8. Assuming a user of network device 830 is located within wireless network 834A, the network device may automatically connect to system controller 810A as discussed herein. Using a web browser 836 for example on network device 830, the user may enter an HTTP request using a URL (uniform resource locator) that includes IP/port pair 192.168.3.1:80 (e.g., "http://192.168.3.1:80") (one will recognize that the user may also use a network name in place of the IP address that may be resolved to the IP address by an DNS server 815A, for example, of the system controller). Upon entering the request, the network device 830 may directly communicate with web server 814A (i.e. not via a reverse proxy server). Thereafter, the web server 814A may maintain this direct communication with the network device or may redirect the network device to reverse proxy server 818A and continue to communicate with the network device through the reverse proxy server and connection 821. Regardless, the network device 830 and web server 816A may continue to interact with the web server 816A eventually providing the network device 830 with a list of system controllers that user may wish to configure (such as similarly discussed with respect to FIG. 4A, for example). The web browser 836 may display the list to the user. Here, the list may include the two system controllers 810A and 810B. The list provided to the user at the network device 830 may also include for each system controller a respective URL to access the web server 816A, 816B of either system controller. In particular, the provided URLs may correspond to either reverse proxy server 818A (to access the web server 816A of system controller 810A) or to reverse proxy server 820A (to access the web server 816B of system controller 810B). As an example, the URL for web server 816A may be "http://192.168.3.1:8443/ . . . " and the URL for web server 816B may be "http://192.168.3.1:8444/ . . . ") (again, a network name may be used in place of the IP address that may be resolved to the IP address by DNS server 815A, for example). Assuming the user wishes to configure system controller 810A, the user may select the URL corresponding to the server, causing the web browser 836 to issue an HTTP request to reverse proxy server 818A (i.e., issue the request to IP/port pair 192.168.3.1:8443). Upon receiving the HTTP request, reverse proxy server 818A may forward the HTTP request via connection 821 to web browser 816A via network 832 (e.g., similar to the port forwarding discussed herein). Thereafter, the web server 816A may issue an HTTP responses to the web browser 836. This response may be sent by the web server through connection 821 to the reverse proxy server 818A, which may in turn forward the response to the network device 830 via network 834A. Continued communications between the network device 830 and the web server 816A may proceed in a similar fashion with the reverse proxy server 818A forwarding HTTP requests and responses between the web server 816A and the web browser 836 of the network device 830. Again, these continued communications may include the user configuring control devices 802A and/or configuring system controller 810A (although the user may perform other operations). Notably, the user may perform these configurations without knowing that the network device 830 is on network 834A. According to this example, system controller 810A is both a gateway system controller and a target system controller.

Assume next that the user is continuing to communicate with web server 816A via the network 834A (e.g., is continuing to configure control devices 802A) and moves (such as shown by arrow 840) out of range of wireless network 834A and into the range of wireless network 834B. Without the system controllers being configured as shown in FIG. 8, the network device may lose contact with the web server 816A. According to the system of FIG. 8 however, the network device 830 may automatically disconnect from wireless network 834A/system controller 810A and automatically connect to wireless network 834B/system controller 810B based on signal strengths as discussed herein. Again, this disconnect/connect may occur without knowledge of the user. The web browser 836 of the network device 830, continuing to use IP/port pair 192.168.3.1:8443 to communicate with the web browser 816A, may automatically now communicate a next HTTP request to reverse proxy server 820B of system controller 810B. As reverse proxy server 820B receives the HTTP request, it may forward the HTTP request via connection 824 to web server 816A via network 832. Thereafter, the web server 816A may issue an HTTP response to the web browser 836. This response may be sent through connection 824 to the reverse proxy server 820B, which may in turn forward the response to the network device 830 via network 834B. Continued communications between the network device 830 and the web server 816A may proceed in a similar fashion with the reverse proxy server 820B forwarding HTTP requests and responses between the web browser 816A and the network device. Again, these continued communications may include the user configuring control devices 802A and/or system controller 810A. Again, the user may continue to perform these configurations without knowing that the network device changed network connections from network 834A to 834B. According to this example, system controller 810B is a gateway system controller while system controller 810A is a target system controller. As can be seen from this example, the load control system of FIG. 8 may allow a user to move around a load control environment and continue to perform configurations even though the user may be out of direct communication range with the target system controller.

As another example operation of the load control system of FIG. 8, assume above that when being presented with the list of system controllers the user wants to configure system controller 810B rather than system controller 810A. Here, the user may select the URL corresponding to system controller 810B. Upon making that selection, the web browser 836 of the network device 830 may issue an HTTP request to reverse proxy server 820A, the user may select the URL corresponding to the server, causing the web browser 836 to issue an HTTP request to reverse proxy server 818A (i.e., issue the request to IP/port pair 192.168.3.1:8444). Upon receiving the HTTP request, reverse proxy server 820A may forward the HTTP request via connection 822 to web browser 816B via network 832 (e.g., similar to the port forwarding discussed herein). Thereafter, the web server 816B may issue an HTTP responses to the web browser 836. This response may be sent by the web server through connection 822 to the reverse proxy server 820A, which may in turn forward the response to the network device 830 via network 834A. Continued communications between the network device 830 and the web server 816B may proceed in a similar fashion with the reverse proxy server 820A forwarding HTTP requests and responses between the web server 816B and the web browser 836 of the network device 830. Again, these continued communications may include the user configuring control devices 802B and/or configuring system controller 810B (although the user may perform other operations). Notably, the user may perform these configurations without knowing that the network device 830 is on network 834A. According to this example, system controller 810A is a gateway system controller and system controller 810B is a target system controller. As can be seen from this example, load control system 800 may allow a user to perform configurations via a target system controller event though the user may not be in direct communication range with the target system controller.

Assume next that the user is continuing to communicate with web server 816B via the network 834A (e.g., is continuing to configure control devices 802B) and moves (such as shown by arrow 840) out of range of wireless network 834A and into the range of wireless network 834B. As discussed herein, the network device 830 may automatically disconnect from wireless network 834A/system controller 810A and automatically connect to wireless network 834B/system controller 810B based on signal strengths. Again, this disconnect/connect may occur without knowledge of the user. The web browser 836 of the network device 830, continuing to use IP/port pair 192.168.3.1:8444 to communicate with the web browser 816B, may automatically now communicate a next HTTP request to reverse proxy server 818B of system controller 810B. As reverse proxy server 818B receives the HTTP request, it may forward the HTTP request via connection 823 to web server 816B via network 832. Thereafter, the web server 816B may issue an HTTP response to the web browser 836. This response may be sent through connection 823 to the reverse proxy server 818B, which may in turn forward the response to the network device 830 via network 834B. Continued communications between the network device 830 and the web server 816B may proceed in a similar fashion with the reverse proxy server 818B forwarding HTTP requests and responses between the web browser 816B and the network device. Again, these continued communications may include the user configuring control devices 802B and/or system controller 810B. Again, the user may continue to perform these configurations without knowing that the network device changed network connections from network 834A to 834B. According to this example, system controller 810B is both a gateway system controller and a target system controller.

The above description of the system of FIG. 8 may proceed in a similar fashion if the user were to start in network 834B and move to network 834A. The load control system of FIG. 8 is an example, and the mapping features and port forwarding described herein may be implemented in still other fashions that may not use reverse proxy servers. Lastly, with respect to the system of FIG. 8 and other systems described herein, each system controller provides an independent wireless network to the network device. However, from the perspective of the network device, these independent networks appear as one unified network.

Figure 9:
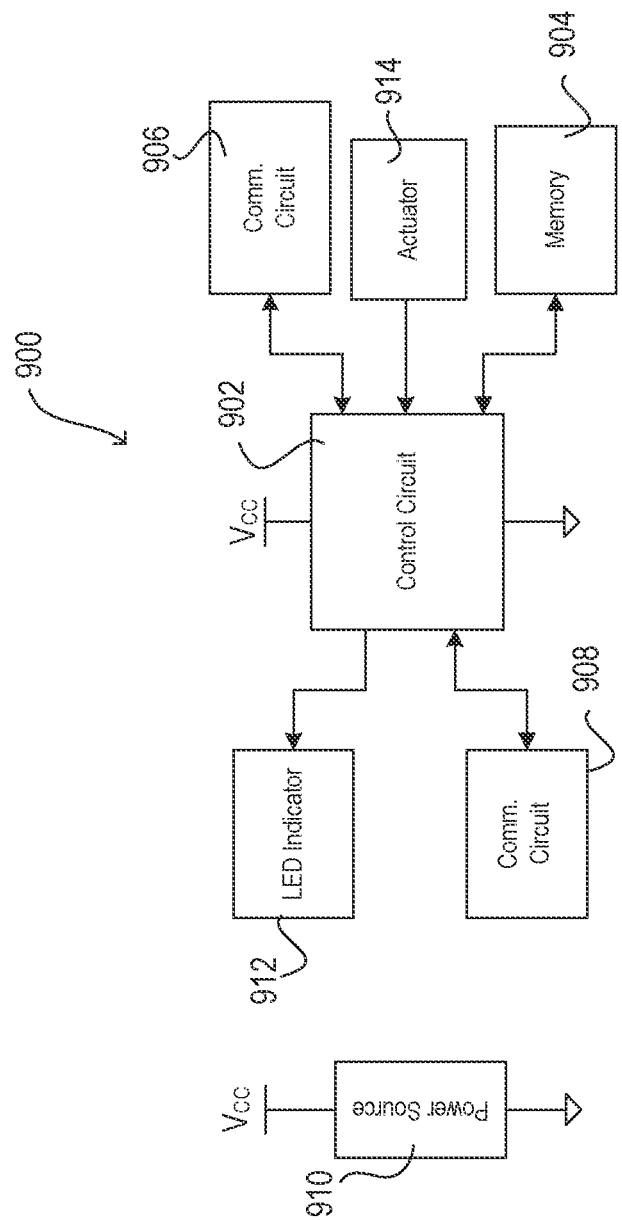
FIG. 9 is a block diagram of an example system controller.

FIG. 9 is a block diagram illustrating an example system controller 900 as described herein. The system controller 900 may be a gateway system controller, a target system controller, a remote system controller, and/or a combination thereof. The system controller 900 may include a control circuit 902 for controlling the functionality of the system controller 900. The control circuit 902 may include one or more general purpose processors, special purpose processors, conventional processors, digital signal processors (DSPs), microprocessors, integrated circuits, a programmable logic device (PLD), application specific integrated circuits (ASICs), or the like. The control circuit 902 may perform signal coding, data processing, power control, input/output processing, or any other functionality that enables the system controller 900 to perform as described herein. The control circuit 902 may store information in and/or retrieve information from the memory 904. The memory 904 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The system controller 900 may include a communications circuit 906 for transmitting and/or receiving information. The communications circuit 906 may perform wireless and/or wired communications. The system controller 900 may also, or alternatively, include a communications circuit 908 for transmitting and/or receiving information. The communications circuit 908 may perform wireless and/or wired communications. Communications circuits 906 and 908 may be in communication with control circuit 902. The communications circuits 906 and 908 may include RF transceivers or other communications modules capable of performing wireless communications via an antenna. The communications circuit 906 and communications circuit 908 may be capable of performing communications via the same communication channels or different communication channels. For example, the communications circuit 906 may be capable of communicating (e.g., with a network device, over a network, etc.) via a wireless communication channel (e.g., BLUETOOTH®, near field communication (NFC), WIFI®, WI-MAX®, cellular, etc.) and the communications circuit 908 may be capable of communicating (e.g., with control devices and/or other devices in the load control system) via another wireless communication channel (e.g., WI-FI® or a proprietary communication channel, such as CLEAR CONNECT™). Assuming communications circuit 906 is configured to communicate with network devices via a wireless communication channel, and that communications circuit 908 is configured to communicate with control devices via another wireless communication channel, the system controller may also include a still further communications circuit (not shown) for communicating via a wired communications link (e.g., with other system controllers).

The control circuit 902 may be in communication with an LED indicator 912 for providing indications to a user. The control circuit 902 may be in communication with an actuator 914 (e.g., one or more buttons) that may be actuated by a user to communicate user selections to the control circuit 902. For example, the actuator 914 may be actuated to put the control circuit 902 in an association mode and/or communicate association messages from the system controller 900.

Each of the modules within the system controller 900 may be powered by a power source 910. The power source 910 may include an AC power supply or DC power supply, for example. The power source 910 may generate a supply voltage $V_{CC}$ for powering the modules within the system controller 900.

Figure 10:
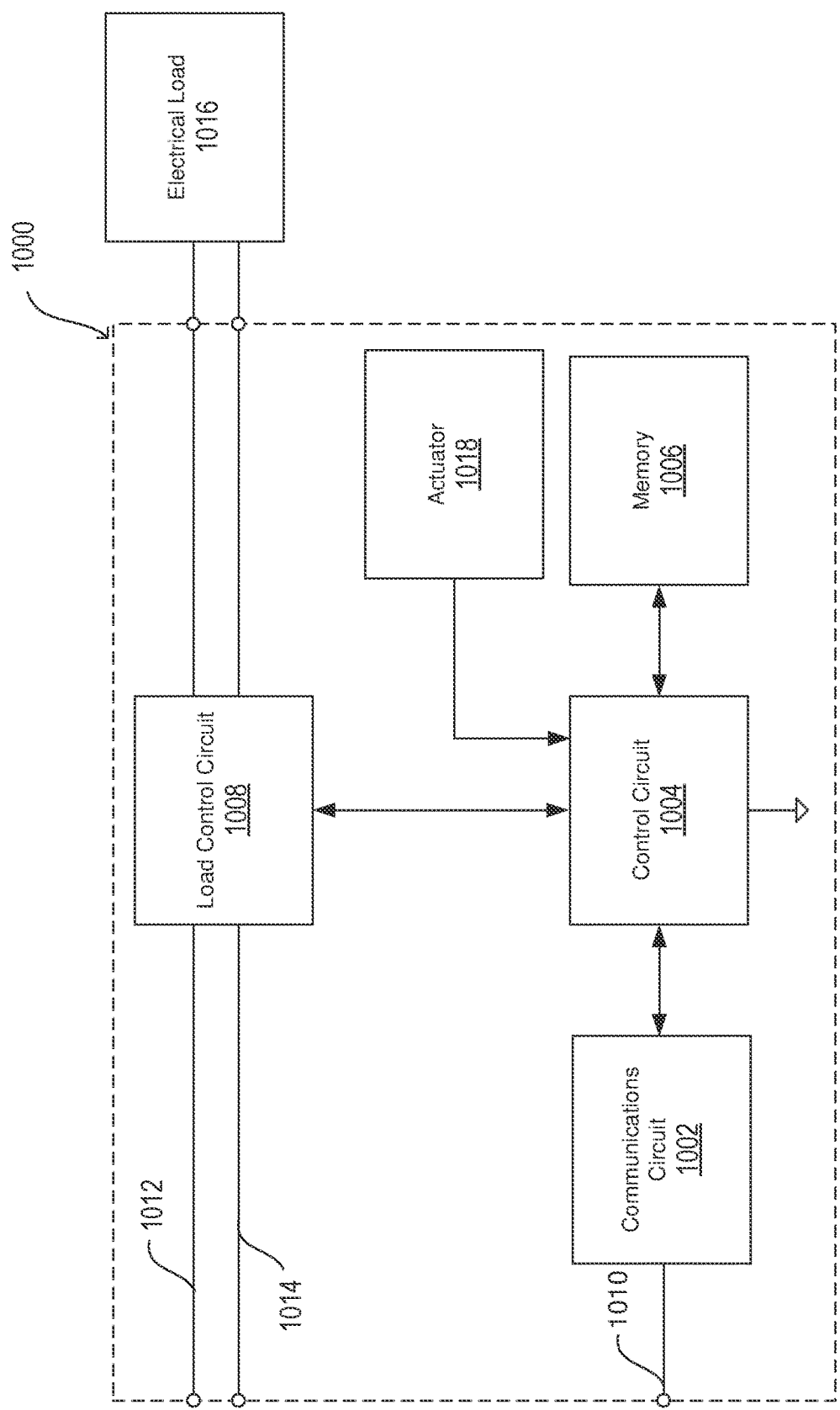
FIG. 10 is a block diagram of an example control-target device.

FIG. 10 is a block diagram illustrating an example control-target device, e.g., a load control device 1000, as described herein. The load control device 1000 may be a dimmer switch, an electronic switch, an electronic ballast for lamps, an LED driver for LED light sources, an AC plug-in load control device, a temperature control device (e.g., a thermostat), a motor drive unit for a motorized window treatment, or other load control device. The load control device 1000 may include a communications circuit 1002. The communications circuit 1002 may include a receiver, an RF transceiver, or other communications module capable of performing wired and/or wireless communications via communications link 1010. The communications circuit 1002 may be in communication with control circuit 1004. The control circuit 1004 may include one or more general purpose processors, special purpose processors, conventional processors, digital signal processors (DSPs), microprocessors, integrated circuits, a programmable logic device (PLD), application specific integrated circuits (ASICs), or the like. The control circuit 1004 may perform signal coding, data processing, power control, input/output processing, or any other functionality that enables the load control device 1000 to perform as described herein.

The control circuit 1004 may store information in and/or retrieve information from the memory 1006. For example, the memory 1006 may maintain a registry of associated control devices and/or control configuration instructions. The memory 1006 may include a non-removable memory and/or a removable memory. The load control circuit 1008 may receive instructions from the control circuit 1004 and may control the electrical load 1016 based on the received instructions. The load control circuit 1008 may send status feedback to the control circuit 1004 regarding the status of the electrical load 1016. The load control circuit 1008 may receive power via the hot connection 1012 and the neutral connection 1014 and may provide an amount of power to the electrical load 1016. The electrical load 1016 may include any type of electrical load.

The control circuit 1004 may be in communication with an actuator 1018 (e.g., one or more buttons) that may be actuated by a user to communicate user selections to the control circuit 1004. For example, the actuator 1018 may be actuated to put the control circuit 1004 in an association mode and/or communicate association messages from the load control device 1000.

Figure 11:
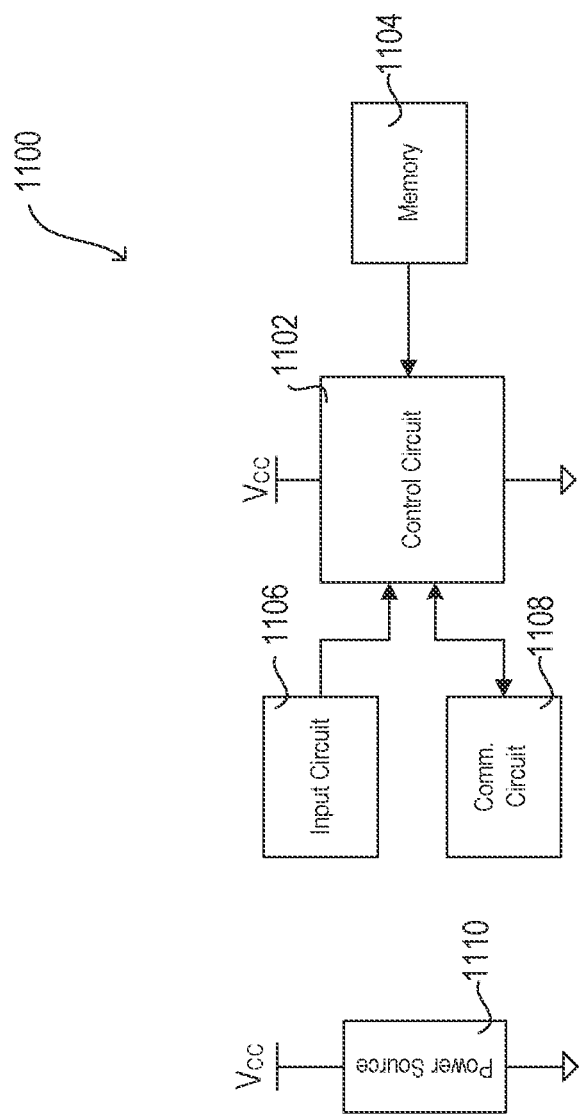
FIG. 11 is a block diagram of an example control-source device.

FIG. 11 is a block diagram illustrating an example control-source device 1100 as described herein. The control-source device 1100 may be a remote-control device, an occupancy sensor, a daylight sensor, a window sensor, a temperature sensor, and/or the like. The control-source device 1100 may include a control circuit 1102 for controlling the functionality of the control-source device 1100. The control circuit 1102 may include one or more general purpose processors, special purpose processors, conventional processors, digital signal processors (DSPs), microprocessors, integrated circuits, a programmable logic device (PLD), application specific integrated circuits (ASICs), or the like. The control circuit 1102 may perform signal coding, data processing, power control, input/output processing, or any other functionality that enables the control-source device 1100 to perform as described herein.

The control circuit 1102 may store information in and/or retrieve information from the memory 1104. The memory 1104 may include a non-removable memory and/or a removable memory, as described herein.

The control-source device 1100 may include a communications circuit 1108 for transmitting and/or receiving information. The communications circuit 1108 may transmit and/or receive information via wired and/or wireless communications. The communications circuit 1108 may include a transmitter, an RF transceiver, or other circuit capable of performing wired and/or wireless communications. The communications circuit 1108 may be in communication with control circuit 1102 for transmitting and/or receiving information.

The control circuit 1102 may also be in communication with an input circuit 1106. The input circuit 1106 may include an actuator (e.g., one or more buttons) or a sensor circuit (e.g., an occupancy sensor circuit, a daylight sensor circuit, or a temperature sensor circuit) for receiving input that may be sent to a device for controlling an electrical load. For example, the control-source device may receive input from the input circuit 1106 to put the control circuit 1102 in an association mode and/or communicate association messages from the control-source device. The control circuit 1102 may receive information from the input circuit 1106 (e.g., an indication that a button has been actuated or sensed information). Each of the modules within the network device 1100 may be powered by a power source 1110.

Figure 12:
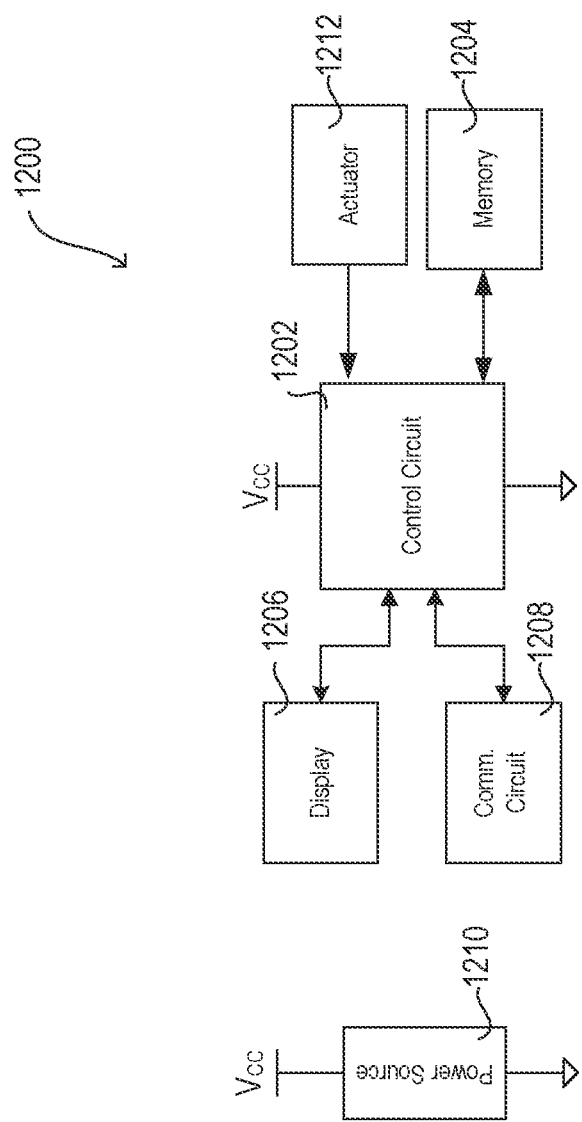
FIG. 12 is a block diagram of an example network device.

FIG. 12 is a block diagram illustrating an example network device 1200 as described herein. The network device 1200 may include the network device 128, 330, or 830, for example. The network device 1200 may include a control circuit 1202 for controlling the functionality of the network device 1200. The control circuit 1202 may include one or more general purpose processors, special purpose processors, conventional processors, digital signal processors (DSPs), microprocessors, integrated circuits, a programmable logic device (PLD), application specific integrated circuits (ASICs), or the like. The control circuit 1202 may perform signal coding, data processing, power control, input/output processing, or any other functionality that enables the network device 1200 to perform as described herein. The control circuit 1202 may store information in and/or retrieve information from the memory 1204. The memory 1204 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The network device 1200 may include a communications circuit 1208 for transmitting and/or receiving information. The communications circuit 1208 may perform wireless and/or wired communications. The communications circuit 1208 may include an RF transceiver or other circuit capable of performing wireless communications via an antenna. Communications circuit 1208 may be in communication with control circuit 1202 for transmitting and/or receiving information.

The control circuit 1202 may also be in communication with a display 1206 for providing information to a user. The processor 1202 and/or the display 1206 may generate GUIs for being displayed on the network device 1200. The display 1206 and the control circuit 1202 may be in two-way communication, as the display 1206 may include a touch screen module capable of receiving information from a user and providing such information to the control circuit 1202. The network device may also include an actuator 1212 (e.g., one or more buttons) that may be actuated by a user to communicate user selections to the control circuit 802.

Each of the modules within the network device 1200 may be powered by a power source 1210. The power source 1210 may include an AC power supply or DC power supply, for example. The power source 1210 may generate a supply voltage $V_{CC}$ for powering the modules within the network device 1200.

Although features and elements are described herein in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and non-transitory/tangible computer-readable storage media. Examples of non-transitory/tangible computer-readable storage media include, but are not limited to, a read only memory (ROM), a random-access memory (RAM), removable disks, and optical media such as CD-ROM disks, and digital versatile disks (DVDs).

What is claimed is:

1. An electrical load control system, comprising:

a plurality of system controllers communicatively couplable via a first network connection, wherein each respective one of the plurality of system controllers:
  shares a common service set identifier (SSID) and SSID password; and
  communicatively couples to one or more respective control devices via a second network connection;
wherein each of the plurality of system controllers includes:
  memory circuitry;
  communication circuitry;
  control circuitry communicatively coupled to the memory circuitry and to the communication circuitry, the control circuitry to:
    broadcast the SSID via a third network connection different from the first network connection and the second network connection;
    receive, from a network device, the SSID password via the third network connection; and
    responsive to receipt of the SSID password from the network device:
      provide to the network device via the third network connection:
        data indicative of one or more of the plurality of system controllers communicatively coupled via the first network connection to the respective system controller and with which the network device may communicatively couple;
        data indicative of the one or more control devices communicatively coupled via the second network connection to each respective one of the one or more system controllers;
      receive, from the network device via the third network connection, an input indicative of a target system controller selected from the one or more system controllers communicatively coupled to the respective system controller; and
      responsive to the receipt of the input indicative of the target system controller:
        redirect inputs received via the third network connection from the network device to the target system controller; and
        redirect inputs received from the target system controller via the first network to the network device.

2. The electrical load control system of claim 1 wherein the control circuitry to further:
  seamlessly transfer the third network connection with the network device from the respective system controller to a second control circuit disposed in a second system controller, wherein the respective system controller and the second system controller share the common SSID and SSID password.

3. The electrical load control system of claim 2 wherein, responsive to the receipt via the third network connection, of the input from the network device indicative of the target system controller, the control circuitry to further:
  retrieve, via the first network connection data representative of the one or more control devices communicatively coupled via the second network connection to the target system controller; and
  provide to the network device via the third network connection, the retrieved data representative of the one or more control devices communicatively coupled to the target system controller.

4. The electrical load control system of claim 3 wherein to retrieve the data representative of the one or more control devices communicatively coupled via the second network connection to the target system controller, the control circuitry to further:
  receive, from the target system controller via the first network connection, the data representative of the one or more control devices communicatively coupled via the second network connection to the target system controller.

5. The electrical load control system of claim 3 wherein to retrieve the data representative of the one or more control devices communicatively coupled via the second network connection to the target system controller, the control circuitry to further:
  retrieve from a data structure retained in the memory circuitry, the data representative of the one or more control devices communicatively coupled via the second network connection to the target system controller.

6. The electrical load control system of claim 2 wherein to provide to the network device via the third network connection the data indicative of one or more of the plurality of system controllers communicatively coupled to the respective system controller and with which the network device may communicatively couple, the control circuitry to further:
  provide to the network device via the third network connection, an HTTP Webpage, that includes the data indicative of one or more of the plurality of system controllers communicatively coupled via the first network connection to the respective system controller and with which the network device may communicatively couple.

7. A method of communicatively coupling a network device to a control circuit disposed in one of a plurality of system controllers communicatively coupled via a first network connection, wherein the plurality of system controllers share a common service set identifier (SSID) and SSID password, and wherein each of the plurality of system controllers communicatively couples to one or more respective control devices via a second network connection, the method comprising:
  broadcasting, by the control circuit, the service set identifier (SSID) via a third network connection;
  receiving, by the control circuit, the SSID password from the network device via the third network connection different from the first network connection and the second network connection;
  providing to the network device via the third network connection, responsive to receipt of the SSID password from the network device:
    data indicative of one or more of the plurality of system controllers communicatively coupled, via the first network connection, to the respective control circuit and to which the network device may communicatively couple; and
    data indicative of the one or more control devices communicatively coupled via the second network connection to each respective one of the one or more system controllers; and
  receiving, from the network device via the third network connection, an input indicative of a target system controller selected from the one or more system controllers and, responsive to the receipt of the input indicative of the target system controller:
    redirecting, by the control circuit, inputs received via the third network connection from the network device to the target system controller; and redirecting, by the control circuit, inputs received from the target system controller via the first network connection to the network device.

8. The method of claim 7 wherein the control circuitry to further:
seamlessly transferring, by the control circuit, the third network connection with the network device from the respective system controller to a second control circuit disposed in a second system controller, wherein the respective system controller and the second system controller share the common SSID and SSID password.

9. The method of claim 8 further comprising, responsive to the receipt via the third network connection of the input from the network device indicative of the target system controller:
retrieving, by the control circuit, data representative of the one or more control devices communicatively coupled via the second network connection to the target system controller; and
providing, to the network device via the third network connection, the retrieved data representative of the one or more control devices communicatively coupled to the target system controller.

10. The method of claim 9, wherein retrieving the data representative of the one or more control devices communicatively coupled via the second network connection to the target system controller further comprising:
receiving, by the control circuit via the first network connection, from the target system controller the data representative of the one or more control devices communicatively coupled via the second network connection to the target system controller.

11. The method of claim 9, wherein retrieving the data representative of the one or more control devices communicatively coupled via the second network connection to the target system controller, further comprises:
retrieve from a data structure retained in communicatively coupled memory circuitry, the data representative of the one or more control devices communicatively coupled via the second network connection to the target system controller.

12. The method of claim 8 wherein providing to the network device via the third network connection the data indicative of one or more of the plurality of system controllers communicatively coupled to the respective system controller and with which the network device may communicatively couple, further comprises:
providing, by the control circuit to the network device via the third network connection, an HTTP Webpage, that includes the data indicative of one or more of the plurality of system controllers communicatively coupled via the first network connection to the respective system controller to which the network device may communicatively couple.

13. A non-transitory, machine-readable, storage device that includes instructions that, when executed by control circuit in a system controller communicatively couplable via a first network connection to a plurality of system controllers that share a common service set identifier (SSID) and SSID password, each of the system controllers couplable via a second network connection to one or more respective control devices, cause the control circuit to:
broadcast the SSID via a third network connection different from the first network connection and the second network connection;
receive the SSID password from a network device via the third network connection;
responsive to receipt of the SSID password from the network device, provide to the network device via the third network connection:
data indicative of one or more of the plurality of system controllers communicatively coupled via the first network connection to the respective control circuit and to which the network device may communicatively couple via the control circuit; and
data indicative of the one or more control devices communicatively coupled via the second network connection to each respective one of the one or more system controllers; and
receive from the network device via the third network, an input indicative of a target system controller selected from the one or more system controllers; and
responsive to the receipt of the input indicative of the target system controller:
redirect inputs received from the network device via the third network to the target system controller; and
redirect inputs received from the target system controller via the first network to the network device.

14. The non-transitory, machine-readable, storage device of claim 13 wherein the instructions, when executed by the control circuit, further cause the control circuit to:
seamlessly transfer the third network connection with the network device from the respective system controller to a second control circuit disposed in a second system controller, wherein the respective system controller and the second system controller share the common SSID and SSID password.

15. The non-transitory, machine-readable, storage device of claim 14 wherein the instructions, when executed by the control circuit, further cause the control circuit to:
responsive to the receipt, via the third network connection, of the input indicative of the target system controller from the network device:
retrieve, via the first network connection, data representative of the one or more control devices communicatively coupled via the second network connection to the target system controller; and
provide, to the network device via the third network connection, the retrieved data representative of the one or more control devices communicatively coupled to the target system controller.

16. The non-transitory, machine-readable, storage device of claim 15, wherein the instructions that cause the control circuit to retrieve the data representative of the one or more control devices communicatively coupled via the second network connection to the target system controller further cause the control circuit to:
receive, from the target system controller via the first network connection, the data representative of the one or more control devices communicatively coupled via the second network connection to the target system controller.

17. The non-transitory, machine-readable, storage device of claim 15, wherein the instructions that cause the control circuit to retrieve the data representative of the one or more control devices communicatively coupled via the second network connection to the target system controller, further cause the control circuit to:
retrieve from a data structure retained in communicatively coupled memory circuitry, the data representative of the one or more control devices communicatively coupled via the second network connection to the target system controller.

18. The non-transitory, machine-readable, storage device of claim 13 wherein the instructions that cause the control circuit to provide to the network device via the third network, the data indicative of one or more system controllers communicatively coupled to the respective system controller to which the network device may communicatively couple, further cause the control circuit to:

provide, as an HTTP Webpage to the network device via the third network, the data indicative of one or more of the plurality of system controllers communicatively coupled to the respective system controller to which the network device may communicatively couple.

* * * * *